United States Patent
Fujimoto

(10) Patent No.: US 6,678,221 B2
(45) Date of Patent: Jan. 13, 2004

(54) OPTICAL DISK APPARATUS

(75) Inventor: Mitsuteru Fujimoto, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 194 days.

(21) Appl. No.: 09/959,610

(22) PCT Filed: Mar. 1, 2001

(86) PCT No.: PCT/JP01/01570
§ 371 (c)(1),
(2), (4) Date: Dec. 26, 2001

(87) PCT Pub. No.: WO01/65550
PCT Pub. Date: Jul. 9, 2001

(65) Prior Publication Data
US 2002/0159343 A1 Oct. 31, 2002

(30) Foreign Application Priority Data
Mar. 1, 2000 (JP) .......................................... 2000-56241

(51) Int. Cl.⁷ ................................................ G11B 7/00
(52) U.S. Cl. ................................. 369/44.29; 369/44.34; 369/44.36; 369/124.01
(58) Field of Search .......................... 369/44.23, 44.25, 369/44.27, 44.28, 44.29, 44.32, 44.34, 44.35, 44.41, 47.1, 53.1, 53.28, 124.01, 124.1, 124.12, 44.36

(56) References Cited

U.S. PATENT DOCUMENTS 5,710,748 A * 1/1998 Hofer ...................... 369/44.35
6,084,835 A * 7/2000 Buchler et al. .......... 369/44.32

FOREIGN PATENT DOCUMENTS

| JP | 05151583 | 6/1993 |
| JP | 9-161279 | 6/1997 |
| JP | 10-162485 | 6/1998 |
| JP | 11-16172 | 1/1999 |
| JP | 2001-118263 | 4/2001 |

* cited by examiner

Primary Examiner—Muhammad Edun
(74) Attorney, Agent, or Firm—Wenderoth, Lind & Ponack, L.L.P.

(57) ABSTRACT

The present invention relates to an optical disk apparatus which performs information recording or reproduction into/from an optical disk, and provides an optical disk apparatus which makes the amount of optical pickup movement performed before adjustment of a track error signal suited and enables reduction of a start-up time. When a track error signal is subjected to adjustment, it is previously detected in a signal amplitude detecting circuit 17 whether an optical pickup 1 is located in an area where a required track on an optical disk medium 2 exists or not, and a micro processing unit 6 executes the procedure which uses only the necessary but minimum moving time, even when the optical pickup is required to be moved.

16 Claims, 17 Drawing Sheets

OPTICAL DISK APPARATUS

TECHNICAL FIELD

The present invention relates to an optical disk apparatus which performs recording or reproduction of information into/from an optical disk and, more particularly, to one which can perform adjustment of a track error signal reliably and effectively thereby to shorten a start-up time at starting this apparatus into which an optical disk medium is installed.

BACKGROUND ART

Hereinafter, a conventional optical disk apparatus will be described.

FIG. 14 is a block diagram illustrating a constitution of the conventional optical disk apparatus.

In FIG. 14, numeral 2 denotes an optical disk medium such as a CD, a CD-ROM, a DVD, and an MO, which has a track for information recording, and numeral 1 denotes an optical pickup which collects a semiconductor laser to irradiate the light to a target position on the optical disk medium 2, thereby to perform recording and reproduction of information, and this comprises an optical system and a driving system. The optical system collects a laser beam on the surface of the optical disk medium 2 or detects a deviation between a irradiated position of a laser beam and a target position on the optical disk medium 2, and it comprises a semiconductor laser, lenses, a beam splitter, a photodiode or the like (all not shown). On the other hand, the driving system is driven to perform a focus control which makes an objective lens follow plane wobbles on the optical disk medium 2 or a tracking control which makes the objective lens follow track wobbles, and keeps the positional relationship between the target position on the optical disk medium 2 and a laser beam spot constant, and it mainly comprises a magnet, a coil, and a support member (all not shown). The driving system serves as an actuator which drives the lenses of the optical system.

Numeral 3 denotes an operational amplifier which performs various arithmetic processings to a returned light quantity signal from the optical disk medium 2 which returned light is detected by photodiodes which are divided into plural parts, which photodiodes construct the optical pickup 1, and it outputs a focus error signal (hereinafter, referred to as FE signal) presenting a focus deviation quantity of the laser beam spot on the optical disk medium 2, a track error signal (hereinafter, referred to as TE signal) presenting a positional deviation amount of the laser beam spot with relative to a track on the optical disk medium 2, and a reproduction signal (hereinafter, referred to as RF signal) presenting information recorded as a change in light reflectance on the optical disk medium 2. Numeral 4 denotes a focus control circuit which performs a focus control of collecting the laser beam irradiated from the optical pickup 1 to focus the same on the optical disk medium 2, numeral 5 denotes a focus driving circuit which is controlled by the focus control circuit 4 and drives an actuator of an objective lens of the optical pickup 1, and numeral 6 denotes a micro processing unit (hereinafter, referred to as MPU) presenting an arithmetic processing unit, and by a command of this MPU 6, ON/OFF of the above-mentioned focus control operation is operated. Numeral 7 denotes an adjusting circuit which comprises an offset control circuit 71 and a variable gain amplifier 72, and receives the TE signal outputted from the operational amplifier 3, adjusts a gain and an offset by settings from the MPU 6, and outputs a track error signal after adjustment (hereinafter, referred to as a TEA signal), numeral 8 denotes a tracking control circuit which receives the TEA signal and performs a control so that the irradiated position of the laser beam follows the track of the optical disk medium 2, and numeral 9 denotes a tracking driving circuit which drives the objective lens of the optical pickup 1 with controlled by the tracking control circuit 8, and ON/OFF of this tracking control operation is operated by a command of the MPU 6.

Numeral 10 denotes a traverse control circuit which receives a control output signal (hereinafter, referred to as TRO signal) outputted from the tracking control circuit 8, and generates a TVO signal presenting a control signal for moving the optical pickup 1 itself to follow in a radial direction of the optical disk 2 when the irradiated position of the laser beam of the optical pickup 1 follows the spiral track on the optical disk medium 2, numeral 11 denotes a traverse driving circuit which receives the TVO signal and drives an after-mentioned traverse motor 12, and numeral 12 denotes a traverse motor which moves the optical pickup 1 in a radial direction of the optical disk medium 2. Further, numeral 13 denotes a signal processing circuit which receives the RF signal outputted from the operational amplifier 3, and reproduces information from the optical disk medium 2, and it extracts a SYNC signal presenting a synchronization signal from the RF signal. Numeral 14 denotes a spindle motor control circuit which receives the SYNC signal extracted from the signal processing circuit 13 and outputs a DMO signal for controlling the rotation number of the optical disk medium 2, numeral 15 denotes a spindle motor driving circuit which receives the DMO signal from the spindle motor control circuit 14 and drives an after-mentioned spindle motor, and numeral 16 denotes a spindle motor for rotating the optical disk medium 2, and the rotation of the spindle motor 16 can be also controlled at a prescribed rotation number by inputting an FG signal indicating a rotation number to the spindle motor control circuit 14, not by the SYNC signal.

Next, an adjusting operation of the track error signal, which is performed when the conventional optical disk apparatus on which the optical disk medium 2 is mounted is started will be described with reference to the flow chart in FIG. 15.

When the optical disk medium 2 is mounted on the optical disk apparatus or the power is turned ON (Step S901), the MPU 6 initializes the position of the optical pickup 1 (Step S902). More specifically, the traverse motor 12 is driven so as to move the optical pickup 1 forcibly to the inner periphery side of the optical disk medium 2 until an innermost periphery switch (not shown) is pressed (Step S903). When there is no innermost periphery switch, the traverse motor 12 is kept driven while the optical pickup 1 is surely moved to a limit of the movable range in which the optical pickup 1 can move to the inner periphery side. After the optical pickup 1 is moved to the innermost periphery position of the optical disk medium 2 in this way, the optical pickup 1 is moved to the outer periphery side for a pre-scribed time so as to be located at a position where the track on the optical disk medium 2 exists (Step S904).

FIG. 16 illustrates an area structure of the optical disk medium, such as a general compact disk (hereinafter, referred to as a CD), a recordable CD-R, or a rewritable CD-RW, in a radial direction. As shown in FIG. 16, the innermost periphery part is a clamp area A1 for mounting the disk, and an information area A2 where a track exists exists outside the clamp area. In the inner periphery and outer periphery of the information area A2, there exist mirror surface areas A30 and A31 in which a reflecting layer is formed but no tracks exist and substrate areas A40 and A41 made only of transparent substrates. Therefore, the optical pickup 1 is located in the information area A2 of the optical disk medium 2 by the above-described operation of initializing the position of the optical pickup 1.

Next, a returned light quantity from the optical disk medium 2 when an objective lens of the optical pickup 1 is operated up and down in a focus direction is detected from the level of the RF signal, and the presence or absence of the disk is judged (Step S905). At that time, it is utilized that a prescribed RF signal level can be obtained when the optical disk medium 2 is actually mounted on the optical disk apparatus. As the result of the judgement, when the optical disk medium 2 is judged to be mounted, the spindle motor 16 is driven to rotate the optical disk medium 2 (Step S906), and the focus control of the optical pickup 1 is turned ON (Step S907).

The collected laser beam spot crosses the track on the optical disk medium 2 due to eccentricity of the optical disk medium 2 itself or the deviation of the center at mounting or the like. This state is referred to as track cross state. While the TE signal at the track cross state is of an almost sine wave form as shown in FIG. 17, its signal amplitude or signal offset may be changed due to difference in reflectance of the optical disk medium 2, difference in sensitivity of the photodiode, asymmetry of groove shape in the track, or the like. Then, the TE signal has its gain and offset adjusted by the offset adjusting circuit 71 and the variable gain amplifier 72 that construct the adjusting circuit 7 based on setting from the MPU 6, so that the TEA signal presenting a track error signal after adjustment as shown in FIG. 17 is generated (Step S908). The track error signal is subjected to adjustment in this way, whereby a control operation can be performed so that the laser beam spot of the optical pickup 1 performs tracking accurately in the center of the track on the optical disk medium 2.

When the tracking control is prepared to be operated accurately by the above-described adjustment of the track error signal, the tracking control is turned ON (Step S909), and a traverse following control is subsequently turned ON so that the laser beam spot of the optical pickup 1 follows the spiral track on the optical disk medium 2 (Step S910).

In this way, the laser beam spot of the optical pickup 1 can accurately follow the track on the optical disk medium 2, whereby information in the optical disk medium 2 can be reproduced (Step S911), and the start-up of the optical disk apparatus is completed.

The so-constructed conventional optical disk apparatus transfers the optical pickup in a radial direction of the optical disk medium at a prescribed speed with the position of the objective lens of the optical pickup held, and almost prescribed track cross frequency is obtained, thereby to enhance adjustment accuracy of the amplitude and offset of the track error signal.

However, the above-described conventional optical disk apparatus have the following problem.

That is, the conventional optical disk apparatus is required to initialize the position of the optical pickup 1 before adjusting the track error signal, and to move the optical pickup 1 to the initialized position in several seconds so as to move the optical pickup 1 with no impulse added or no noise generated when moving the same to the innermost periphery position.

Therefore, the optical pickup 1 needs to be subjected to the moving operation to the initialized position though its position at start-up is within the information area where the track on the optical disk medium 2 exists, excepting such a specific situation where an abnormal operation termination is generated as a case where the optical pickup 1 is in runaway state and the power is turned OFF, whereby a start-up time of the optical disk apparatus until information from the optical disk medium 2 is read to be recorded/reproduced becomes longer.

The present invention is made to solve the above-mentioned problem and has for its object to obtain an optical disk apparatus which performs adjustment of a track error signal accurately and effectively, thereby to shorten a start-up time.

DISCLOSURE OF THE INVENTION

To solve the above-described problem, an optical disk apparatus according to claim 1 of the present invention comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: an amplitude detecting means for detecting amplitude of the track error signal; and a transfer means for transferring the optical pickup in a radial direction of the optical disk medium, and the focus control means focuses the light beam irradiated from the optical pickup onto the optical disk medium, and the adjusting means adjusts the gain and offset of the track error signal when the amplitude of the track error signal detected by the amplitude detecting means is equal to or larger than a previously set value, while the optical pickup is transferred to a previously decided position when the amplitude of the track error signal detected by the amplitude detecting means is under the previously set value.

According to the present invention, shift of the optical pickup to the initialized position at start-up can be almost eliminated, resulting in drastic reduction of a startup time.

According to claim 2 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: an amplitude detecting means for detecting amplitude of the track error signal; an objective lens shift means for providing a signal to the tracking driving means to shift an objective lens of the optical pickup in a radial direction of the optical disk medium; and a transfer means for transferring the optical pickup in the radial direction of the optical disk medium, and the focus control means focuses the light beam irradiated from the optical pickup onto the optical disk medium, and according to a first comparison result which is obtained by comparing amplitude of a first track error signal detected in the amplitude detecting means with a previously set value in a state where the objective lens of the optical pickup is shifted in an outer periphery direction of the optical disk medium by the objective lens shift means, as well as a second comparison result which is obtained by comparing amplitude of a second track error signal detected in the amplitude detecting means with the previously set value in a state where the objective lens of the optical pickup is shifted in an inner periphery direction of the optical disk medium by the objective lens shift means, the gain and offset of the track error signal are adjusted when the first and the second comparison results are both equal to or larger than the previously set value; the optical pickup is transferred in the outer periphery direction of the optical disk medium when the first comparison result is equal to or larger than the previously set value and the second comparison result is under the previously set value; the optical pickup is transferred in the inner periphery direction of the optical disk medium when the first comparison result is under the previously set value and the second comparison result is equal to or larger than the previously set value; and the optical pickup is transferred to a previously decided position when the first and the second comparison results are both under the previously set value.

According to the present invention, it is decided whether the optical pickup needs to be moved before the adjusting operation of the track error signal is performed, and the optical pickup can be moved to the most appropriate direction also when the movement is judged to be required, whereby the movement of the optical pickup can be optimized even when the optical pickup is located at a boundary of the area where the track on the optical disk medium exists at startup, resulting in drastic reduction of a startup time.

According to claim 3 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: an amplitude detecting means for detecting amplitude of the track error signal; an objective lens shift means for providing a signal to the tracking driving means to shift an objective lens of the optical pickup in a radial direction of the optical disk medium; and a transfer means for transferring the optical pickup in the radial direction of the optical disk medium, and the transfer means transfers the optical pickup in an outer periphery direction of the optical disk medium, the focus control means focuses the light beam irradiated from the optical pickup onto the optical disk medium, and shift of the objective lens is stopped and the adjusting means adjusts the gain and offset of the track error signal when the amplitude of the track error signal detected by the amplitude detecting means is equal to or larger than a previously set value in a state where the objective lens of the optical pickup is shifted in the outer periphery direction of the optical disk medium by the objective lens shift means, while the optical pickup is transferred in an inner periphery direction of the optical disk medium when the amplitude of the track error signal detected by the amplitude detecting means is under the previously set value.

According to the present invention, the amount of the optical pickup moving at startup can be drastically decreased, resulting in drastic reduction of a startup time.

According to claim 4 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: an amplitude detecting means for detecting amplitude of the track error signal; an objective lens shift means for providing a signal to the tracking driving means to shift an objective lens of the optical pickup in a radial direction of the optical disk medium; and a transfer means for transferring the optical pickup in the radial direction of the optical disk medium, and the transfer means transfers the optical pickup in an inner periphery direction of the optical disk medium, the focus control means focuses the light beam irradiated from the optical pickup onto the optical disk medium, and shift of the objective lens is stopped and the gain and offset of the track error signal are adjusted by the adjusting means when the amplitude of the track error signal detected by the amplitude detecting means is equal to or larger than a previously set value in a state where the objective lens shift means shifts the objective lens of the optical pickup in the inner periphery direction of the optical disk medium, while the optical pickup is transferred in an inner periphery direction of the optical disk medium when the amplitude of the track error signal detected by the amplitude detecting means is under the previously set value.

According to the present invention, the amount of the optical pickup moving at startup can be drastically decreased, resulting in drastic reduction of a startup time.

According to claim 5 of the present invention, in the optical disk apparatus as defined in any of claims 1 to 4, the amplitude of the track error signal is detected by the amplitude detecting means for a period of one rotation or more in synchronization with the rotation of the optical disk medium.

According to the present invention, amplitude of the track error signal can be certainly detected even when the status of the track error signal is changed due to eccentricity of the optical disk medium itself, the deviation of the center at mounting, vibration of the objective lens of the optical pickup, or the like.

According to claim 6 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: a returned light quantity detecting means for detecting a returned light quantity from the optical disk medium; an amplitude detecting means for detecting amplitude of an output signal of the returned light quantity detecting means; and a transfer means for transferring the optical pickup in a radial direction of the optical disk medium, and the focus control means focuses the light beam from the optical pickup onto the optical disk medium, and the adjusting means adjusts the gain and offset of the track error signal when the amplitude of the returned light quantity signal detected by the amplitude detecting means is equal to or larger than a previously set value, while the optical pickup is transferred to a previously decided position when the amplitude of the returned light quantity signal detected by the amplitude detecting means is under the previously set value.

According to the present invention, shift of the optical pickup to the initialized position at start-up can be almost eliminated, resulting in drastic reduction of a startup time.

According to claim 7 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: a returned light quantity detecting means for detecting a returned light quantity from the optical disk medium; an amplitude detecting means for detecting amplitude of an output signal of the returned light quantity detecting means; an objective lens shift means for providing a signal to the tracking driving means to shift an objective lens of the optical pickup in a radial direction of the optical disk medium; and a transfer means for transferring the optical pickup in the radial direction of the optical disk medium, and the focus control means focuses the light beam irradiated from the optical pickup onto the optical disk medium, and according to a first comparison result which is obtained by comparing amplitude of a first returned light quantity signal detected in the amplitude detecting means with a previously set value in a state where the objective lens of the optical pickup is shifted in an outer periphery direction of the optical disk medium by the objective lens shift means, as well as a second comparison result which is obtained by comparing amplitude of a second returned light quantity signal detected in the amplitude detecting means with the previously set value in a state where the objective lens of the optical pickup is shifted in an inner periphery direction of the optical disk medium by the objective lens shift means, the gain and offset of the track error signal are adjusted when the first and the second comparison results are both equal to or larger than the previously set value; the optical pickup is transferred in the outer periphery direction of the optical disk medium when the first comparison result is equal to or larger than the previously set value and the second comparison result is under the previously set value; the optical pickup is transferred in the inner periphery direction of the optical disk medium when the first comparison result is under the previously set value and the second comparison result is equal to or larger than the previously set value; and the optical pickup is transferred to a previously decided position when the first and the second comparison results are both under the previously set value.

According to the present invention, it is decided whether the optical pickup needs to be moved before the adjusting operation of the track error signal is performed, and the optical pickup can be moved to the most appropriate direction also when the movement is judged to be required, whereby the movement of the optical pickup can be optimized even when the optical pickup is located at a boundary of the area where the track on the optical disk medium exists at startup, resulting in drastic reduction of a startup time.

According to claim 8 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: a returned light quantity detecting means for detecting a returned light quantity from the optical disk medium; an amplitude detecting means for detecting amplitude of an output signal of the returned light quantity detecting means; an objective lens shift means for providing a signal to the tracking driving means to shift an objective lens of the optical pickup in a radial direction of the optical disk medium; and a transfer means for transferring the optical pickup in the radial direction of the optical disk medium, and the transfer means transfers the optical pickup in an outer periphery direction of the optical disk medium, the focus control means focuses the light beam from the optical pickup onto the optical disk medium, and shift of the objective lens is stopped and the gain and offset of the track error signal are adjusted by the adjusting means when the amplitude of the returned light quantity signal detected by the amplitude detecting means is equal to or larger than a previously set value in a state where the objective lens of the optical pickup is shifted in the outer periphery direction of the optical disk medium by the objective lens shift means, while the optical pickup is transferred in an inner periphery direction of the optical disk medium when the amplitude of the returned light quantity signal detected by the amplitude detecting means is under the previously set value.

According to the present invention, the amount of the optical pickup moving at startup can be drastically decreased, resulting in drastic reduction of a startup time.

According to claim 9 of the present invention, an optical disk apparatus comprising: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprises: a returned light quantity detecting means for detecting a returned light quantity from the optical disk medium; an amplitude detecting means for detecting amplitude of an output signal of the returned light quantity detecting means; an objective lens shift means for providing a signal to the tracking driving means to shift an objective lens of the optical pickup in a radial direction of the optical disk medium; and a transfer means for transferring the optical pickup in the radial direction of the optical disk medium, and the transfer means transfers the optical pickup in an inner periphery direction of the optical disk medium, the light beam irradiated from the optical pickup is focused onto the optical disk medium by the focus control means, and shift of the objective lens is stopped and the gain and offset of the track error signal are adjusted by the adjusting means when the amplitude of the returned light quantity signal detected by the amplitude detecting means is equal to or larger than a previously set value in a state where the objective lens of the optical pickup is shifted in the inner periphery direction of the optical disk medium by the objective lens shift means, while the optical pickup is transferred in an outer periphery direction of the optical disk medium when the amplitude of the returned light quantity signal detected by the amplitude detecting means is under the previously set value.

According to the present invention, the amount of the optical pickup moving at startup can be drastically decreased, resulting in drastic reduction of a startup time.

According to claim 10 of the present invention, in the optical disk apparatus as defined in any of claims 6 to 9, the amplitude of the returned light quantity signal is detected by the amplitude detecting means for a period of one rotation or more in synchronization with the rotation of the optical disc medium.

According to the present invention, amplitude of the track error signal can be certainly detected even when the status of the returned light quantity signal is changed due to eccentricity of the optical disk medium itself, the deviation of the center at mounting, vibration of the objective lens of the optical pickup, or the like.

BEST MODE TO EXECUTE THE INVENTION

Hereinafter, embodiments of the present invention will be described with reference to figures.

(Embodiment 1)

Figure 1:
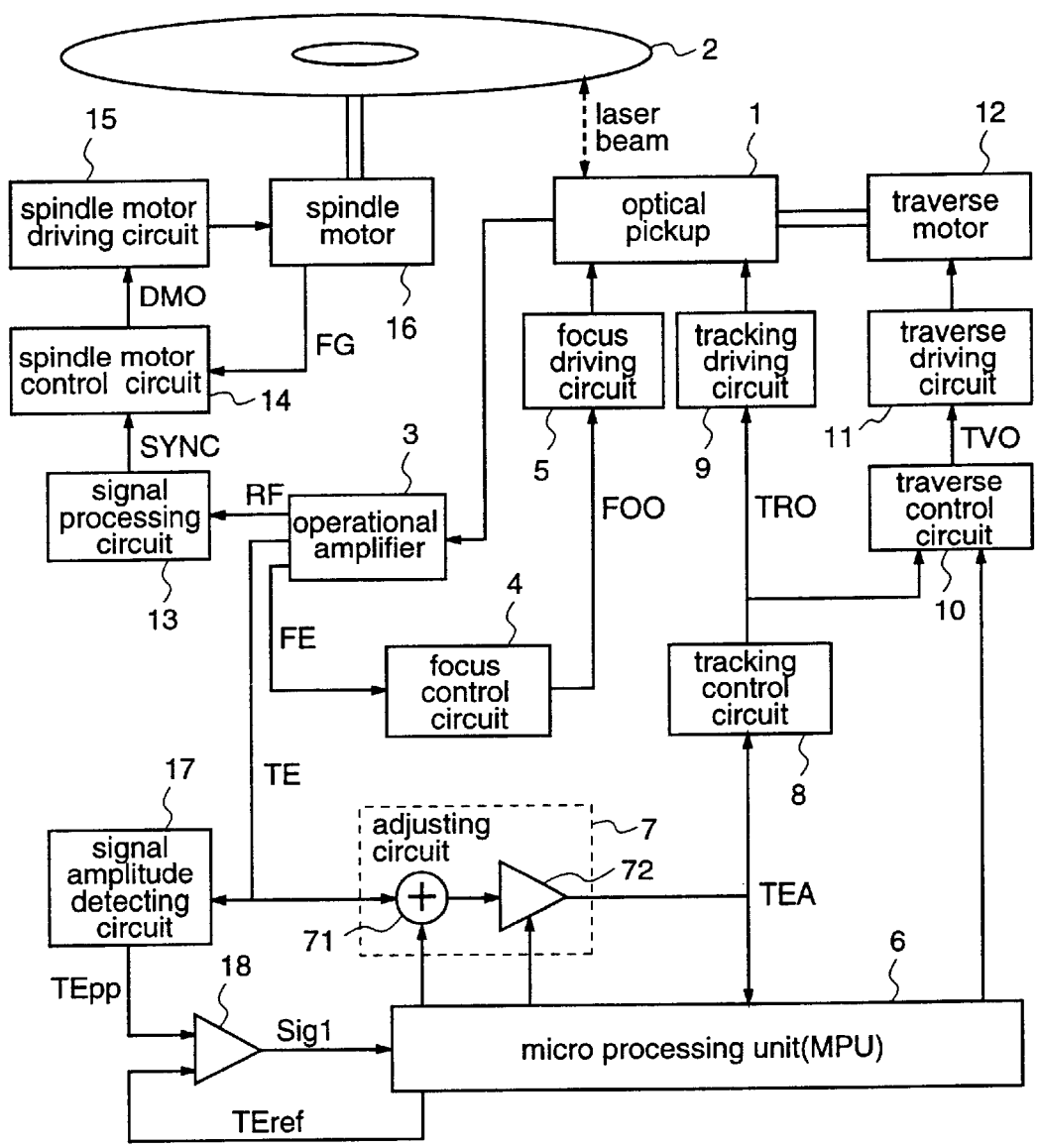
FIG. 1 is a block diagram illustrating a constitution of an optical disk apparatus according to a first embodiment of the present invention.

FIG. 1 is a block diagram illustrating a constitution of an optical disk apparatus according to a first embodiment of the present invention.

In FIG. 1, numeral 2 denotes an optical disk medium such as a CD, a CD-ROM, a DVD, and an MO, which has a track for information recording, and numeral 1 denoted an optical pickup which collects a semiconductor laser to irradiate the light to a target position on the optical disk medium 2, thereby to perform recording or reproduction of information, and this comprises an optical system and a driving system. The optical system collects a laser beam on the surface of the optical disk medium 2 or detects a deviation between a irradiated position of a laser beam and a target position on the optical disk medium 2, and it comprises a semiconductor laser, lenses, a beam splitter, a photodiode or the like (all not shown). On the other hand, the driving system is driven to perform a focus control which makes an objective lens follow plane wobbles on the optical disk medium 2 or a tracking control which makes the objective lens follow track wobbles, and keeps the positional relationship between the target position on the optical disk medium 2 and a laser beam spot constant, and it mainly comprises a magnet, a coil, and a support member (all not shown). The driving system serves as an actuator which drives the lenses of the optical system.

Numeral 3 denotes an operational amplifier (track error detecting means) which performs various arithmetic processings to a returned light quantity signal from the optical disk medium 2 which returned light is detected by photodiodes which are divided into plural parts, which photodiodes construct the optical pickup 1, and it outputs a focus error signal (hereinafter, referred to as FE signal) presenting a focus deviation quantity of the laser beam spot on the optical disk medium 2, a track error signal (hereinafter, referred to as TE signal) presenting a positional deviation amount of the laser beam spot with relative to a track on the optical disk medium 2, and a reproduction signal (hereinafter, referred to as RF signal) presenting information recorded as a change in light reflectance on the optical disk medium 2. Numeral 4 denotes a focus control circuit (focus control means) which performs a focus control of collecting the laser beam irradiated from the optical pickup 1 to focus the same on the optical disk medium 2, numeral 5 denotes a focus driving circuit which is controlled by the focus control circuit 4 and drives an actuator of an objective lens of the optical pickup 1, and numeral 6 denotes a micro processing unit (hereinafter, referred to as MPU) presenting an arithmetic processing unit, by a command of MPU 6, ON/OFF of the above-mentioned focus control operation is operated. Numeral 7 denotes an adjusting circuit (adjusting means) which comprises an offset control circuit 71 and a variable gain amplifier 72, and receives the TE signal outputted from the operational amplifier 3, adjusts a gain and an offset by settings from the MPU 6, and outputs a track error signal after adjustment (hereinafter, referred to as a TEA signal), numeral 8 denotes a tracking control circuit which receives the TEA signal and performs a control so that the irradiated position of the laser beam follows the track of the optical disk medium 2, and numeral 9 denotes a tracking driving circuit (tracking driving means) which drives the actuator of the objective lens of the optical pickup 1 with controlled by the tracking control circuit 8, and ON/OFF of this tracking control operation is operated by a command of the MPU 6.

Numeral 10 denotes a traverse control circuit which receives a control output signal (hereinafter, referred to as TRO signal) outputted from the tracking control circuit 8, and generates a TVO signal presenting a control signal for moving the optical pickup 1 itself to follow in a radial direction of the optical disk 2 when the irradiated position of the laser beam of the optical pickup 1 follows the spiral track on the optical disk medium 2, numeral 11 denotes a traverse driving circuit which receives the TVO signal and drives an after-mentioned traverse motor 12, and numeral 12 denotes a traverse motor (transfer means) which moves the optical pickup 1 in a radial direction of the optical disk medium 2. Further, numeral 13 denotes a signal processing circuit which receives the RF signal outputted from the operational amplifier 3, and reproduces information from the optical disk medium 2, and it extracts a SYNC signal presenting a synchronization signal from the RF signal. Numeral 14 denotes a spindle motor control circuit which receives the SYNC signal extracted from the signal processing circuit 13 and outputs a DMO signal for controlling the rotation number of the optical disk medium 2, numeral 15 denotes a spindle motor driving circuit which receives the DMO signal from the spindle motor control circuit 14 and drives an after-mentioned spindle motor, and numeral 16 denotes a spindle motor for rotating the optical disk medium 2, and the rotation of the spindle motor 16 can be also controlled at a prescribed rotation number by inputting an FG signal indicating a rotation number to the spindle motor control circuit 14, not by the SYNC signal. Numeral 17 denotes a signal amplitude detecting circuit (amplitude detecting means) as a means for detecting amplitude of the TE signal before adjustment, which outputs an output signal TEpp. Further, the signal amplitude detecting circuit 17 comprises a peak hold circuit, a bottom hold circuit, and a differential amplifier (all not shown). Numeral 18 denotes a comparator which compares the level of the output signal TEpp outputted from the signal amplitude detecting circuit 17 with a prescribed level signal TEref set by the MPU 6, and has its output signal Sig1 inputted to the MPU 6.

A collected laser beam spot crosses the track on the optical disk medium 2 due to eccentricity of the optical disk medium 2 or the deviation of the center at mounting or the like. This state is referred to as track cross state, and the TE signal in the track cross state is described in FIG. 17(*a*). The level indicated by the TEpp is the above-described output signal outputted in the signal amplitude detecting circuit 17.

Figure 17A:
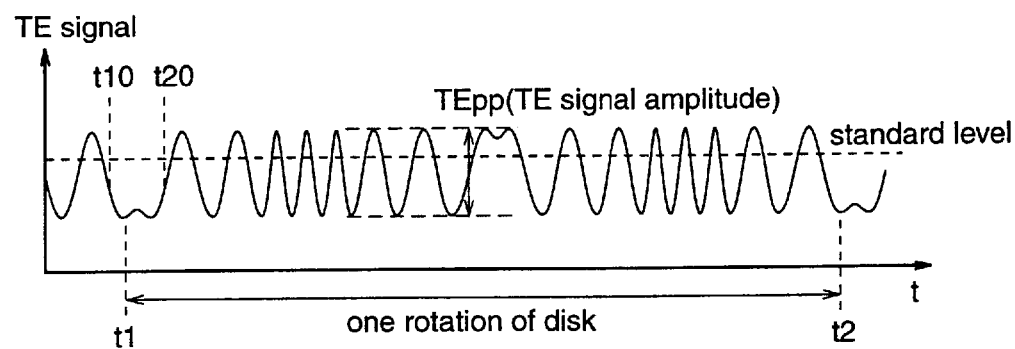
FIG. 17 is a diagram illustrating a TE signal and TEA signal in track cross state.
Figure 17B:
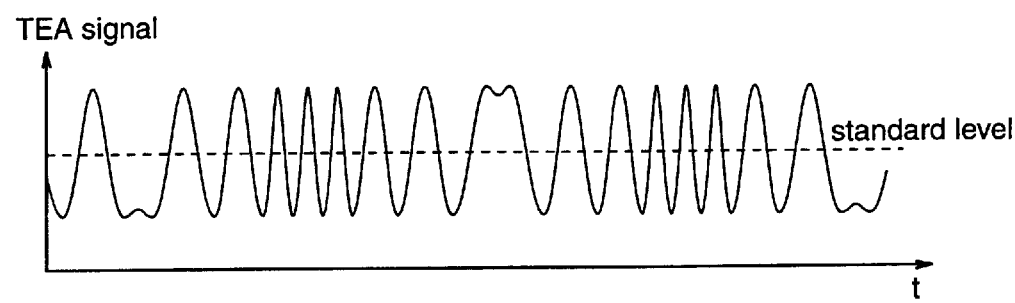

From FIG. 17(*a*), the TE signal is of an almost sine wave form, while its signal amplitude or signal offset may be changed due to difference in reflectance of the optical disk medium 2, difference in sensitivity of the photodiode, asymmetry of groove shape in the track, or the like. Then, the TE signal has its gain and offset adjusted by the offset adjusting circuit 71 and the variable gain amplifier 72 that construct the adjusting circuit 7 based on setting from the MPU 6.

FIG. 17(*b*) illustrates the TEA signal presenting a track error signal after adjustment.

Next, the operation of the optical disk apparatus according to the first embodiment will be described.

Figure 2:
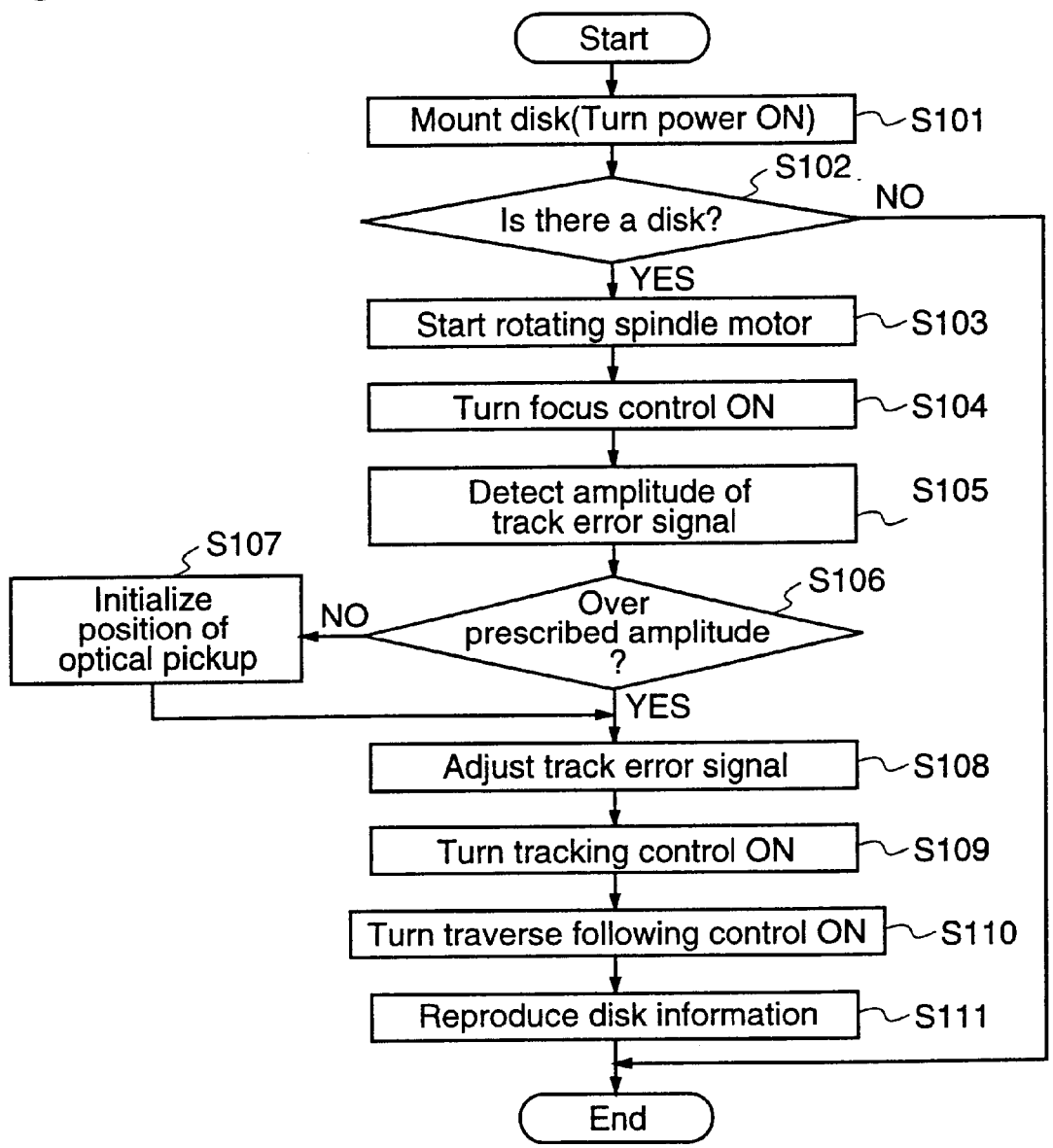
FIG. 2 is a flow chart for explaining the operation of the optical disk apparatus according to the first embodiment of the present invention.

FIG. 2 is a flow chart for explaining the operation of the optical disk apparatus according to the first embodiment of the present invention.

Figure 16A:
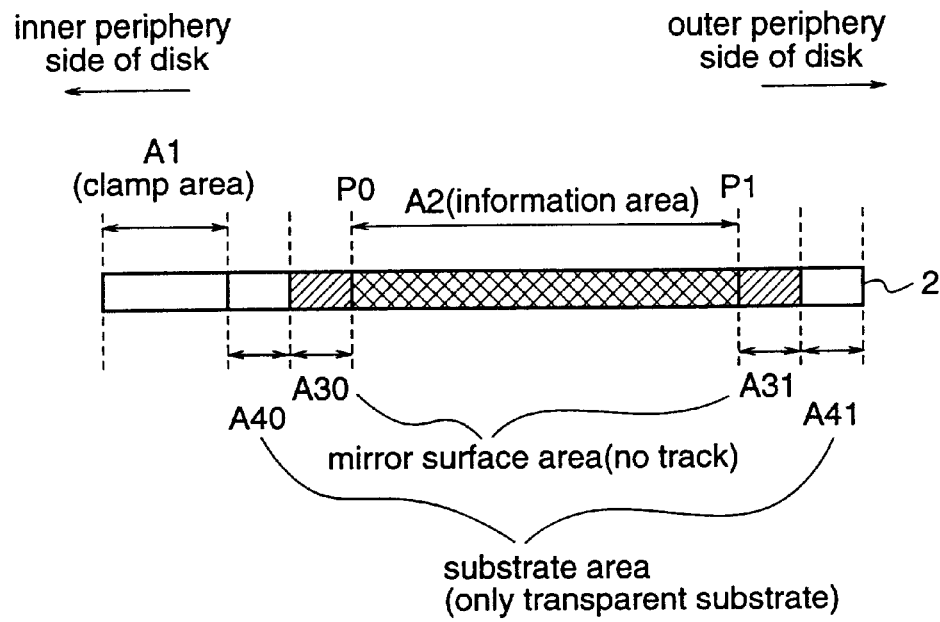
FIG. 16 is a diagram illustrating a constitution of an area in an optical disk medium.
Figure 16B:
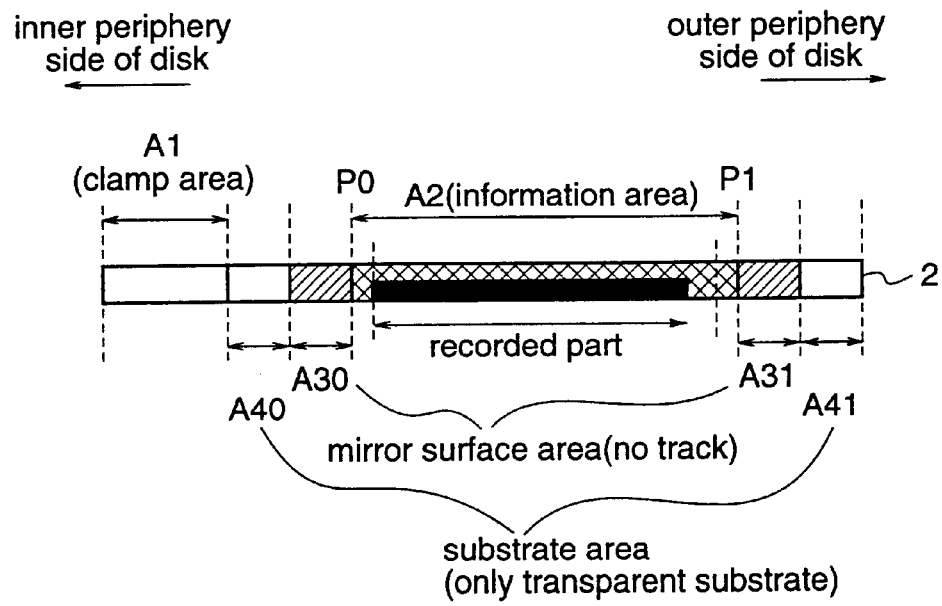

FIG. 16 is a diagram of an area construction of an optical disk medium in a radial direction. In FIG. 16, an innermost periphery part Al denotes a clamp area for mounting the disk, A2 denotes an information area where a track exists, A30 and A31 denote mirror surface areas where no tracks exist, and A40 and A41 denote substrate areas made only of transparent substrates.

When the optical disk medium 2 is mounted on the optical disk apparatus or the power of the optical disk apparatus is turned ON (Step S101), a judgement whether the optical disk medium 2 is in the optical disk apparatus or not is performed (Step 5102). Here, the following operation is performed to judge whether the optical disk medium 2 is in the optical disk apparatus or not.

First, a returned light quantity from the optical disk medium 2 when an objective lens of the optical pickup 1 is operated up and down in a focus direction is detected from the level of the RF signal. When the optical disk medium 2 is mounted on the optical disk apparatus, a prescribed RF signal level is obtained when the optical pickup 1 is located in the information area A2 and the mirror surface areas A30 and A31 of the optical disk medium 2 as shown in FIG. 16. However, the optical pickup 1 before start-up can be located in an area different from a usual one (area other than the information area and the mirror surface area), and thus, the following operation is performed in addition to the judgement of the presence or absence of the optical disk medium 2 by the level of the RF signal. That is, the spindle motor 16 is forcibly accelerated for a definite period of time, a change in the rotation number of the spindle motor 16 is detected from the FG signal, and inertia of a rotor part of the spindle motor 16 is measured, thereby judging the presence or absence of the optical disk medium 2. Here, when the optical disk medium 2 is judged not to exist according to the judgement of the presence or absence of the disk by the RF signal, while the optical disk medium 2 is judged to exist according to the judgement of the presence or absence of the disk by the inertia measurement, for example, it is an abnormal state where the optical pickup 1 before start-up is located in an area different from a usual one, and thus, an operation for initializing the position of the optical pickup 1 is performed to continue the processing. This judgement of the presence or absence of the optical disk medium 2 is performed in Step S102.

Subsequently, when the optical disk medium 2 is judge to exist as the result of the judgement in Step S102, the spindle motor 16 is driven to start rotating the optical disk medium 2 (Step S103), and the focus control of the optical pickup 1 is turned ON (Step S104). On the other hand, when the optical disk medium 2 is judged not to exist in Step S102, the operation is terminated. In Step S104, when the position of the optical pickup 1 is in the information area A2 where the track of the optical disk medium 2 exists, a collected laser beam spot goes into the track cross state due to eccentricity of the optical disk medium 2 or the deviation of the center at mounting or the like. However, when the position of the optical pickup 1 is in the mirror surface areas A30 and A31 where the track of the optical disk medium 2 does not exist, the TE signal is not of an almost sine wave form as shown in FIG. 17 but in a constant level because tracks are not crossed, while the focus control is operated normally.

Next, signal amplitude of the TE signal before adjustment is detected by the signal amplitude detecting circuit 17 (Step S105), the detected signal TEpp is compared with a pre-scribed amplitude signal level TEref, which is set approximately to a level of noise on the TE signal generated by defects on the mirror surface part of the optical disk medium 2 or the like, by the comparator 18, and whether the signal TEpp is equal to or larger than the prescribed amplitude or not is judged (Step S106). When it is equal to or larger than the prescribed amplitude as the result of the judgement, the comparator 18 outputs high level "1" for the output signal Sig1 and the processing proceeds to Step S108. On the other hand, when it is under the prescribed amplitude as the result in Step S106, the comparator 18 outputs low level "0" for the output signal Sig1 and the processing proceeds to Step S107. In Step S108, when the signal Sig1 is "1", the MPU 6 judges the optical pickup 1 is in the information area A2 where the track of the optical disk medium 2 exists and is in a normal track cross state, and adjusts a next track error signal (Step S108). On the other hand, in Step S107, when the signal Sig1 is "0", the MPU 6 judges the optical pickup 1 is in the mirror surface areas A30 and A31 where the track of the optical disk medium 2 does not exist and is not in a normal track cross state, performs the operation for initializing the position of the optical pickup 1, and adjusts the TE signal after the optical pickup 1 is moved to the information area A2 where the track of the optical disk medium 2 exists (Step S108). To initialize the position of the optical pickup 1, however, the focus control is turned OFF first and is finally turned ON again.

When the tracking control is prepared to be operated accurately by the adjustment of the TE signal in Step S108, the tracking control is turned ON next (Step S109), and a traverse following control is subsequently turned ON so that the laser beam spot of the optical pickup 1 follows the spiral track on the optical disk medium 2 (Step S110). Thus, the laser beam spot of the optical pickup 1 can accurately follow the track on the optical disk medium 2, thereby reproducing information in the optical disk medium 2 (Step 111).

As described above, in the optical disk apparatus according to the first embodiment, the movement of the optical pickup 1 to the initialized position at start-up is executed only when the optical pickup 1 at start-up is in an area other than the information area A2 where the track on the optical disk medium 2 exists, whereby the start-up time can be drastically shorten in most cases.

Figure 14:
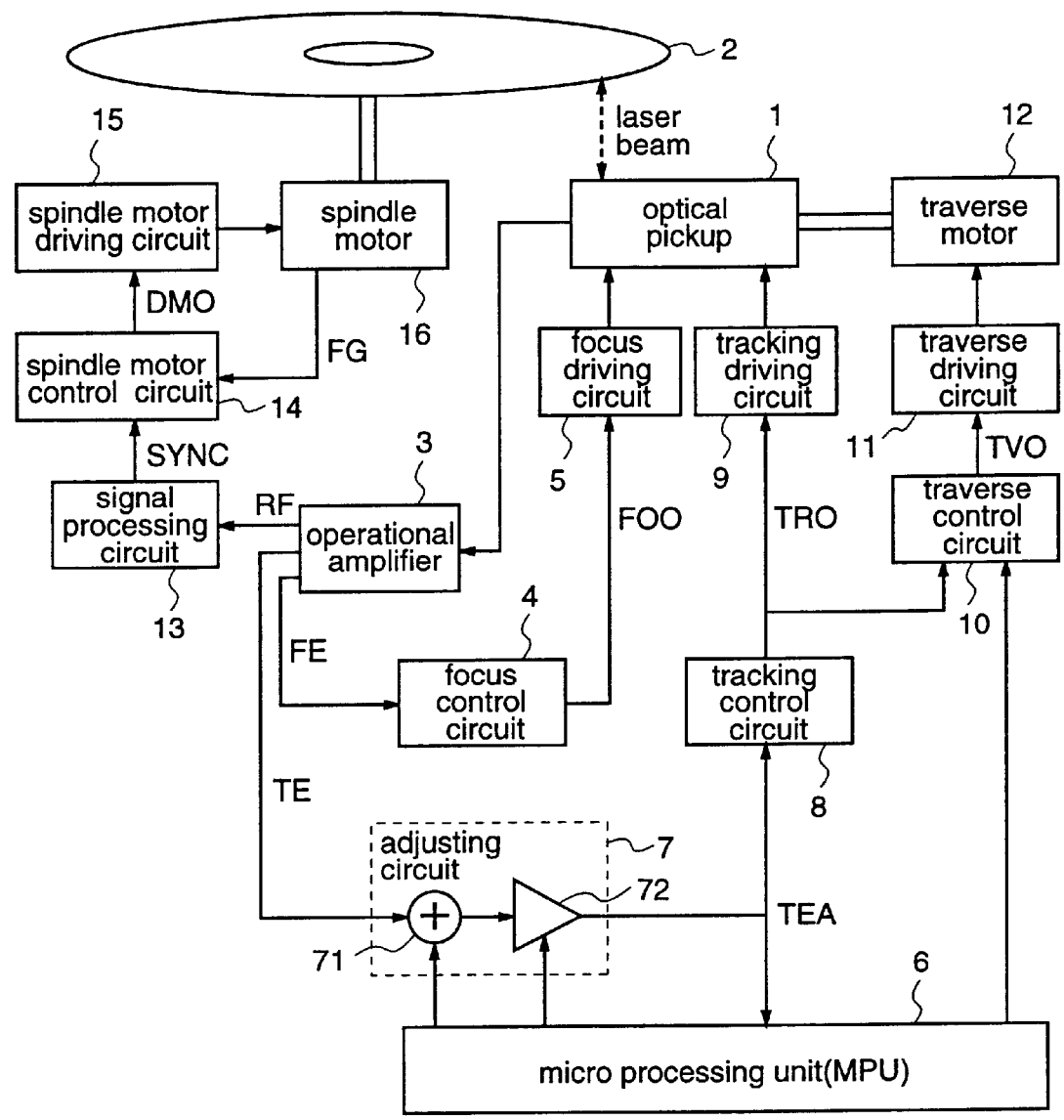
FIG. 14 is a block diagram illustrating a constitution of a conventional optical disk apparatus.
Figure 15:
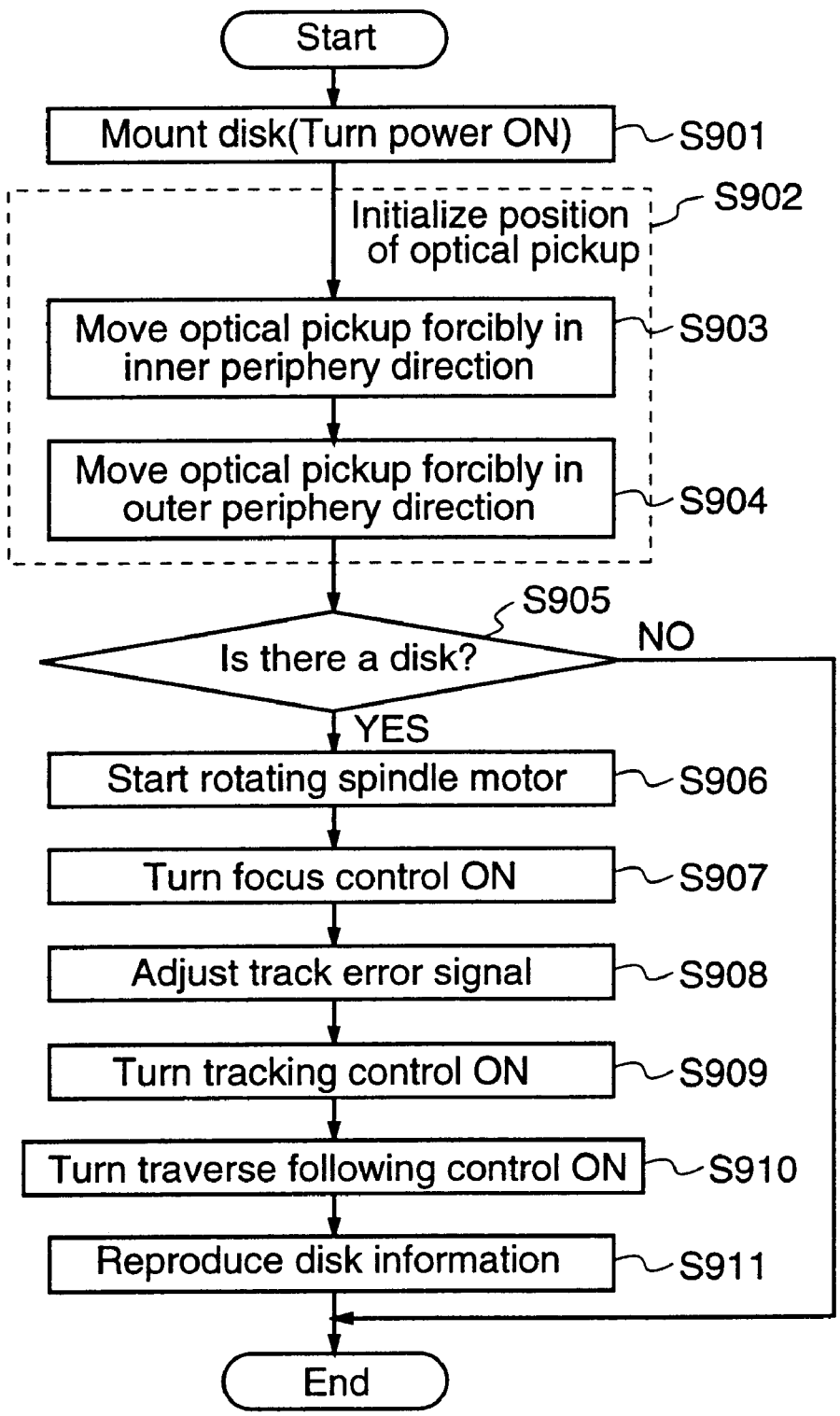
FIG. 15 is a flow chart for explaining the operation of the conventional optical disk apparatus.

While, in the first embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this first embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 2)

Figure 3:
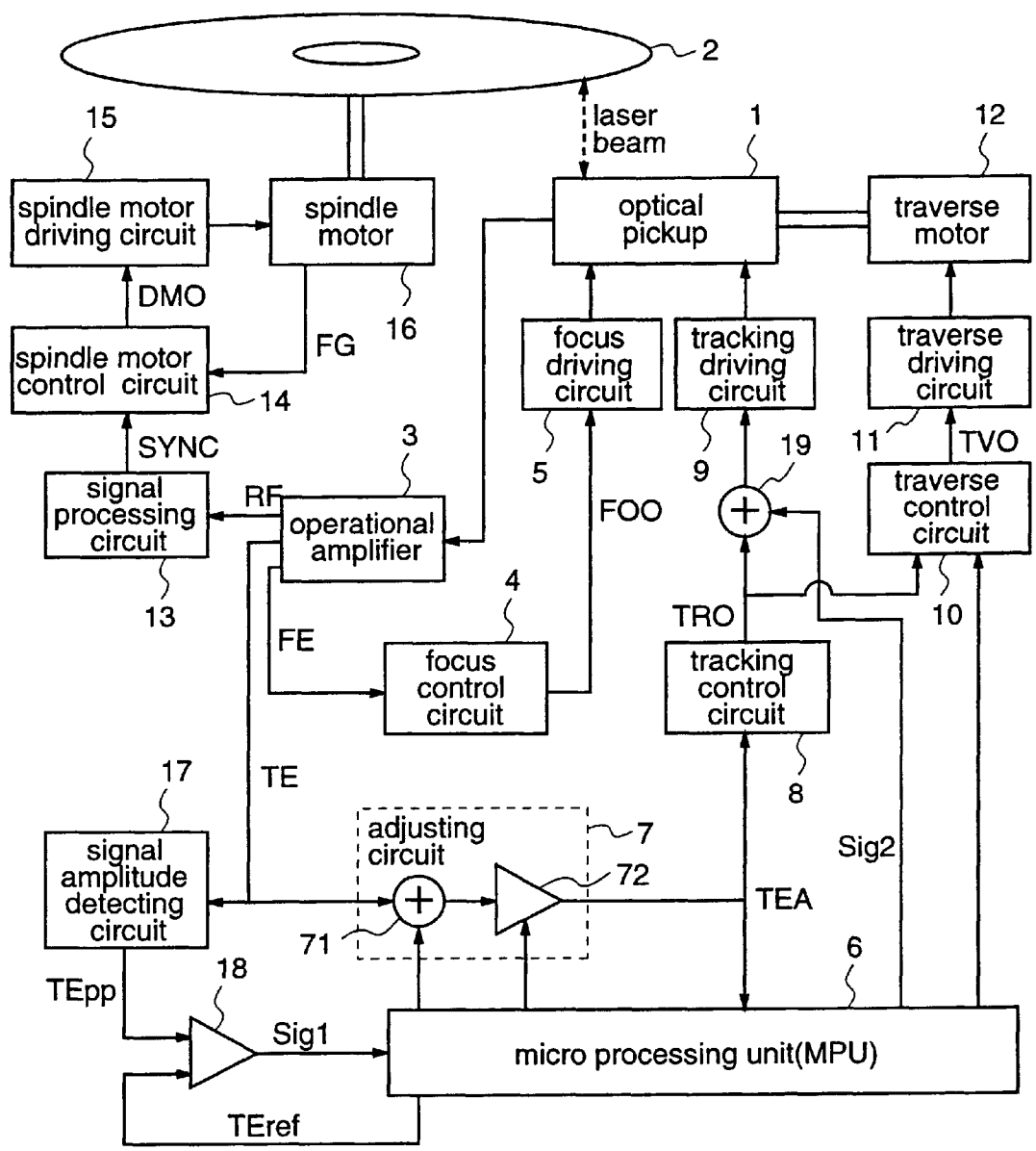
FIG. 3 is a block diagram illustrating a constitution of an optical disk apparatus according to a second to a fourth embodiments of the present invention.

FIG. 3 is a block diagram illustrating a constitution of an optical disk apparatus according to a second embodiment of the present invention.

In FIG. 3, numeral 19 denotes an adder which adds an output signal Sig2 of the MPU 6 and an output signal TRO of the tracking control circuit 8 to output to the tracking driving circuit 9, so that a tracking actuator of the optical pickup 1 is driven. The adder 19 can forcibly shift an objective lens of the optical pickup 1 in a radial direction of the optical disk medium 2 by the output signal Sig2 of the MPU 6. Other same component parts as those shown in FIG. 1 are denoted by the same reference numerals, and their descriptions will be omitted.

Next, the operation of the optical disk apparatus according to the second embodiment will be described.

Figure 4:
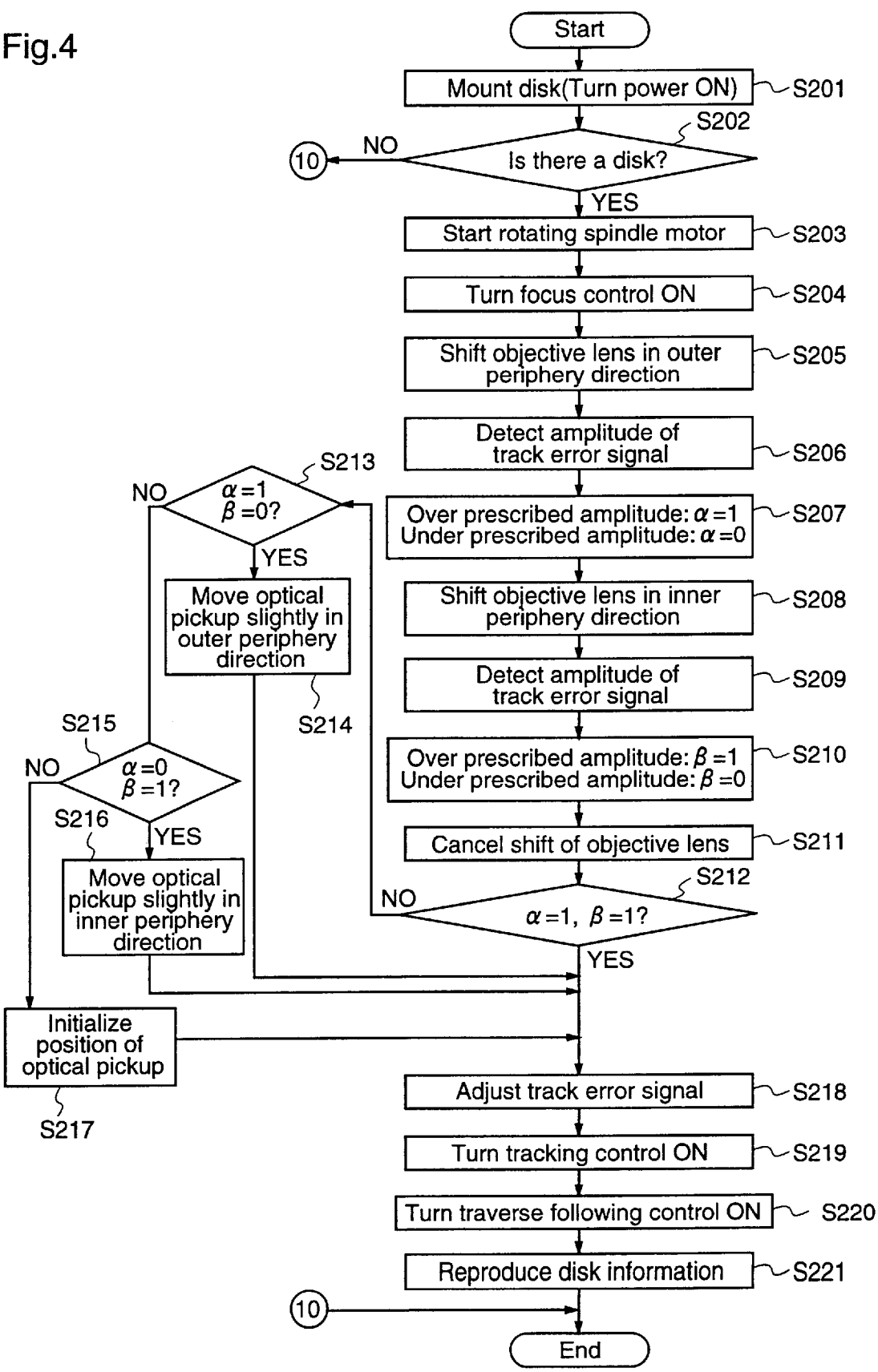
FIG. 4 is a flow chart for explaining the operation of the optical disk apparatus according to the second embodiment of the present invention.

FIG. 4 is a flow chart for explaining the operation of the optical disk apparatus according to the second embodiment of the present invention.

When the optical disk medium 2 is mounted on the optical disk apparatus or the power of the optical disk apparatus is turned ON (Step S201), a judgement whether the optical disk medium 2 is in the optical disk apparatus or not is performed (Step S202). A method of judging whether the optical disk medium 2 is in the optical disk apparatus or not is one by means of the level of the RF signal and inertia as described in the first embodiment, and its description will be omitted. When the optical disk medium 2 is judge to exist as the result of the judgement in Step S202, the spindle motor 16 is driven to start rotating the optical disk medium 2 (Step S203), and the focus control of the optical pickup 1 is turned ON (Step S204). On the other hand, when the optical disk medium 2 is judged not to exist as the result of the judgement in Step S202, the operation is terminated. In Step S204, when the position of the optical pickup 1 is in the information area A2 where the track of the optical disk medium 2 exists as shown in FIG. 16, a collected laser beam spot goes into track cross state as shown in FIG. 17 due to eccentricity of the optical disk medium 2 or the deviation of the center at mounting or the like. On the other hand, when the position of the optical pickup 1 is in the mirror surface areas A30 and A31 where the track of the optical disk medium 2 does not exist as shown in FIG. 16, the TE signal is not of an almost sine wave form as shown in FIG. 17 but in a constant level because tracks are not crossed, while the focus control is operated normally.

Subsequently, the MPU 6 shifts the objective lens of the optical pickup 1 to the outer periphery side of the optical disk medium 2 by the output signal Sig2 (Step S205). In this state, signal amplitude of the TE signal before adjustment is detected by the signal amplitude detecting circuit 17 (Step S206), and the detected output signal TEpp is compared with a prescribed amplitude signal level TEref by the comparator 18. The prescribed amplitude signal level TEref is set approximately to a level of noise on the TE signal generated by defects on the mirror surface part of the optical disk medium 2 or the like. As the result of the comparison in the comparator 18, when the output signal TEpp is equal to or larger than the prescribed amplitude signal level TEref, the comparator 18 outputs high level "1" as the output signal Sig1, while, when the output signal TEpp is under the prescribed amplitude signal level TEref, the comparator 18 outputs low level "0" as the output signal Sig1. The MPU 6 holds this detected value as a variable $\alpha$ (Step S207).

Next, the MPU 6 shifts the objective lens of the optical pickup 1 to the inner periphery side of the optical disk medium 2 by the output signal Sig2 (Step S208). In this state, signal amplitude of the TE signal before adjustment is detected by the signal amplitude detecting circuit 17 (Step S209), and the detected signal TEpp is compared with a prescribed amplitude signal level TEref, which is set approximately to a level of noise on the TE signal generated by defects on the mirror surface part of the optical disk medium 2 or the like, by the comparator 18. As the result of the comparison in the comparator 18, when the output signal TEpp is equal to or larger than the prescribed amplitude signal level TEref, the comparator 18 outputs high level "1" as the output signal Sig1, while, when the output signal TEpp is under the prescribed amplitude signal level TEref, the comparator 18 outputs low level "0" as the output signal Sig1. The MPU 6 holds this detected value as a variable B (Step S210) and cancels the shift of the objective lens (Step S211).

When the optical pickup 1 is located either at a boundary position P0 which is a boundary between the information area A2 where the track of the optical disk medium 2 exists and the mirror surface area A30 where no track exists or at a boundary position P1 which is a boundary between the information area A2 where the track exists and the mirror surface area A31, as shown in FIG. 16, a laser beam of the optical pickup 1 crosses the boundary position P0 or boundary position P1 of the optical disk medium 2 due to eccentricity of the optical disk medium 2 or the deviation of the center at mounting or the like. Since the TE signal is not of an almost sine wave form but in a constant level when the laser beam goes into the mirror surface part, there is the possibility that amplitude of the original TE signal cannot be detected and an appropriate gain may not be set by the variable gain amplifier 72 that constructs the adjusting circuit 7, when the TE signal is adjusted at this position. Here, the above-described outer periphery shift amount and inner periphery shift amount of the objective lens are set larger than the amount of eccentricity and deviation generated by eccentricity of the optical disk medium 2 or the deviation of the center at mounting, whereby the amplitude of the TE signal before adjustment is detected at two positions beyond a range of an area where the track cross state is uncertain, and the detection result of comparing the two detected values of variable $\alpha$ and variable $\beta$ with previously set prescribed amplitude can be obtained. Thus, it is possible to judge more detailed positions of the optical pickup 1 and of the optical disk medium 2 by the variable $\alpha$ and variable $\beta$ as the detected values.

Subsequently, it is judged whether the detected values are $\alpha$="1" as well as $\beta$="1" or not in step S212. When $\alpha$="1" as well as $\beta$="1" as the result of the judgement, the optical pickup 1 is entirely located inside the information area A2, and a certain track cross state can be obtained, whereby the TE signal is adjusted at this position (Step S218). On the other hand, when the detected values are not $\alpha$="1" as well as $\beta$="1" in Step S212, it is judged whether $\alpha$="1" as well as $\beta$="0" or not (Step S213). When the detected values are $\alpha$="1" as well as $\beta$="0" as the result of the judgement, the optical pickup 1 is located at the boundary position P0 between the information area A2 and the mirror surface area A30 where no track exists because track cross state cannot be obtained when the objective lens is shifted to the inner periphery side. Then, the optical pickup 1 is slightly moved to the outer periphery side so that a certain track cross state can be obtained (Step S214), and the TE signal is adjusted. On the other hand, when the detected values are not $\alpha$="1" as well as $\beta$="0" in Step S213, it is judged whether the detected values are $\alpha$="0" as well as $\beta$="1" or not (Step S215). When the detected values are $\alpha$="0" as well as $\beta$="1" as the result of the judgement, the optical pickup 1 is located at the boundary position P1 between the information area A2 and the mirror surface area A31 where no track exists because track cross state cannot be obtained when the objective lens is shifted to the outer periphery side. Then, the optical pickup 1 is slightly moved to the inner periphery side so that a certain track cross state is obtained (Step S216), and the track error signal is adjusted. On the other hand, when the detected values are not $\alpha$="0" as well as $\beta$="1" in Step S215, which means they are $\alpha$="0" as well as $\beta$="0", the optical pickup 1 is entirely located inside the mirror surface areas A30 or A31, and the operation for initializing the position of the optical pickup 1 is performed (Step S217).

After the optical pickup 1 is moved to the information area A2 where the track of the optical disk medium 2 exists in the above-described Steps S212~S217, the TE signal is adjusted (Step S218). The focus control is turned OFF at the beginning of the positional initialization of the optical pickup 1 and the focus control is turned ON again after the operation of the positional initialization is terminated. Also, when the optical pickup 1 is located at a boundary position between the mirror surface area A30 and the substrate area A40 or at a boundary position between mirror surface area A31 and the substrate area A41 in the optical disk medium 2 shown in FIG. 16, and an error status is generated in the focus control by the above-described outer periphery shift operation and inner periphery shift operation of the objective lens, the operation for initializing the position of the optical pickup 1 is performed, and after the optical pickup 1 is moved to the information area A2 where the track of the optical disk medium 2 exists, and the TE signal is adjusted.

Next, since the tracking control is prepared to be operated accurately by the adjustment of the TE signal, the tracking control is turned ON (Step S219), and the traverse following control is subsequently turned ON so that the laser beam spot of the optical pickup 1 follows the spiral track on the optical disk medium 2 (Step S220). By this operation, the laser beam spot of the optical pickup 1 can accurately follow the track on the optical disk medium 2, whereby information in the optical disk medium 2 can be reproduced (Step S221).

As described above, in the optical disk apparatus according to the second embodiment, amplitude of the TE signal before adjustment is detected, two detected values (variables $\alpha$ and $\beta$) are compared with previously set prescribed amplitude, it is judged from the result of the comparison whether the optical pickup 1 is located entirely inside the area where the track on the optical disk medium 2 exists, it is located at an end on the outer periphery side of the area where the track exists, it is located at an end on the inner periphery side of the area where the track exists, or it is located entirely outside the area where the track exists, so as to decide whether the optical pickup needs to be moved before the adjusting operation of the TE signal is performed, and the optical pickup 1 can be moved to the most appropriate direction also when the movement is judged to be required, whereby the movement of the optical pickup 1 can be optimized even when the optical pickup 1 is located at a boundary of the area where the track on the optical disk medium 2 exists at startup, resulting in drastic reduction of a startup time.

While, in the second embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this second embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 3)

FIG. 3 is a block diagram illustrating a constitution of an optical disk apparatus according to a third embodiment of the present invention. Respective constitutions in the figure are described in the second embodiment, and their descriptions will be omitted.

Next, the operation of the optical disk apparatus according to the third embodiment will be described.

Figure 5:
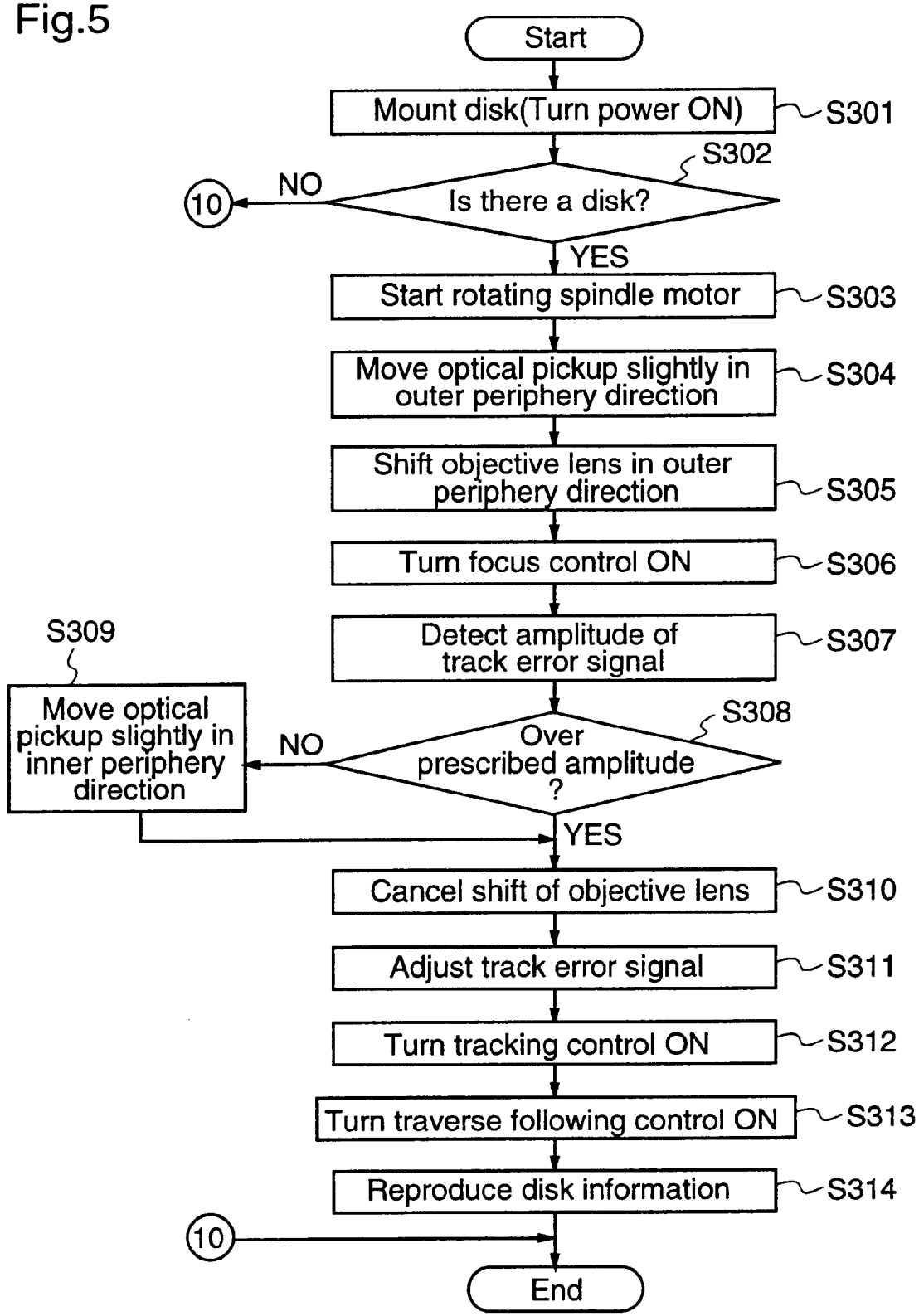
FIG. 5 is a flow chart for explaining the operation of the optical disk apparatus according to the third embodiment of the present invention.

FIG. 5 is a flow chart for explaining the operation of the optical disk apparatus according to the third embodiment of the present invention.

When the optical disk medium 2 is mounted on the optical disk apparatus or the power of the optical disk apparatus is turned ON (Step S301), a judgement whether the optical disk medium 2 is in the optical disk apparatus or not is performed (Step S302). A method of judging whether the optical disk medium 2 is in the optical disk apparatus or not is one by means of the level of the RF signal and inertia as described in the first embodiment, and its description will be omitted. When the optical disk medium 2 is judged to exist as the result of the judgement in Step S302, the spindle motor 16 is driven to start rotating the optical disk medium 2 (Step S303), and the optical pickup 1 is slightly moved in an outer periphery direction of the optical disk medium 2 (Step S304). The amount of the movement then in an outer periphery direction is one from a limit position of the movable range in which the optical pickup 1 can move to the inner periphery side up to entering the information area A2 of the optical disk medium 2 in which tracks are present. When the position of the optical pickup 1 is in the information area A2 where the track of the optical disk medium 2 exists as shown in FIG. 16, a collected laser beam spot goes into track cross state as shown in FIG. 17 due to eccentricity of the optical disk medium 2 or the deviation of the center at mounting or the like. On the other hand, when the position of the optical pickup 1 is in the mirror surface areas A30 and A31 where the track of the optical disk medium 2 does not exist as shown in FIG. 16, the TE signal is not of an almost sine wave form as shown in FIG. 17 but in a constant level because tracks are not crossed, while the focus control is operated normally.

Subsequently, the MPU 6 shifts the objective lens of the optical pickup 1 to the outer periphery side of the optical disk medium 2 by the output signal Sig2 (Step S305), and the focus control is turned ON (Step S306). At this time, when the optical pickup 1 is located on the outer periphery side than the mirror surface area A31 at an outer periphery part of the optical disk medium 2, and an error state is generated in the focus control, a series of error processing operation as described in the first embodiment that the operation for initializing the position of the optical pickup 1 is performed and the TE signal is adjusted thereafter, which is not shown. Subsequently, when the optical pickup 1 is in the information area A2 or the mirror surface area A31 and the focus control is ON, signal amplitude of the TE signal is detected by the signal amplitude detecting circuit 17 (Step S307). Then, the detected output signal TEpp is compared with a prescribed amplitude signal level TEref by the comparator 18, so that whether the output signal TEpp is equal to or larger than the prescribed amplitude signal level TEref or not is judged (Step S308). The amplitude signal level TEref is set approximately to a level of noise on the TE signal generated by defects on the mirror surface part of the optical disk medium 2 or the like. As the result of the judgement in Step S308, when the output signal TEpp is equal to or larger than the prescribed amplitude signal level TEref, the comparator 18 outputs high level "1" as the output signal Sig1, and the processing proceeds to Step S310. On the other hand, as the result of the judgement in Step S308, when the output signal TEpp is under the prescribed amplitude signal level TEref, the comparator 18 outputs low level "0" as the output signal Sig1, and the processing proceeds to Step S309.

Here, when the position of the optical pickup 1 is at the boundary position P1 between the information area A2 where the track of the optical disk medium 2 exists and the mirror surface area A31 where no track exists as shown in FIG. 16, a laser beam of the optical pickup 1 crosses the boundary position P1 of the optical disk medium 2 due to eccentricity of the optical disk medium 2 or the deviation of the center at mounting or the like. Since the TE signal is not of an almost sine wave form but in a constant level when the laser beam goes into the mirror surface part, there is the possibility that amplitude of the original TE signal cannot be detected and an appropriate gain may not be set by the variable gain amplifier 72 that constructs the adjusting circuit 7, when the TE signal is adjusted at this position. Here, the amount of shifting the objective lens to the outer periphery side is set larger than the amount of eccentricity and deviation generated by eccentricity of the optical disk medium 2 or the deviation of the center at mounting, whereby the laser beam is emitted to the outer periphery side than an area where the track cross state is uncertain, and thus the laser beam certainly goes into the mirror surface part A31 and the detected signal Sig1 is low level "0", and the optical pickup 1 is slightly moved to the inner periphery side of the optical disk medium 2 so that the optical pickup 1 is certainly moved inside the information area A2 (Step S309). On the other hand, when the position of the optical pickup 1 is slightly on the inner periphery side than the boundary position P1 between the information area A2 where the track of the optical disk medium 2 exists and the mirror surface area A31 where no track exists as shown in FIG. 16, the outer periphery shift of the objective lens is next canceled in either judgement (Step 5310), while amplitude of the TE signal is detected in a state where the track cross state is uncertain since the objective lens of the optical pickup 1 is shifted to the outer periphery side as described above, whereby the laser beam certainly goes into the information area A2.

After the optical pickup 1 is moved to the information area A2 where the track of the optical disk medium 2 exists in the above-described Steps S308 and S309, the TE signal is adjusted (Step S311). When the tracking control is prepared to be operated accurately by the adjustment of the TE signal in Step S311, the tracking control is turned ON next (Step S312), and the traverse control is subsequently turned ON so that the laser beam spot of the optical pickup 1 follows the spiral track on the optical disk medium 2 (Step S313). By this operation, the laser beam spot of the optical pickup 1 can accurately follow the track on the optical disk medium 2, whereby information in the optical disk medium 2 can be reproduced (Step S314).

As described above, in the optical disk apparatus according to the third embodiment, the amount of the optical pickup 1 moving at startup can be drastically decreased, resulting in drastic reduction of a startup time.

While, in the third embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this third embodiment may be also realized without the signal amplitude detecting circuit 17 and the comparator 18 added, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 4)

FIG. 3 is a block diagram illustrating a constitution of an optical disk apparatus according to a fourth embodiment of the present invention. Respective constitutions in the figure are described in the second embodiment, and their descriptions will be omitted.

Next, the operation of the optical disk apparatus according to the fourth embodiment will be described.

Figure 6:
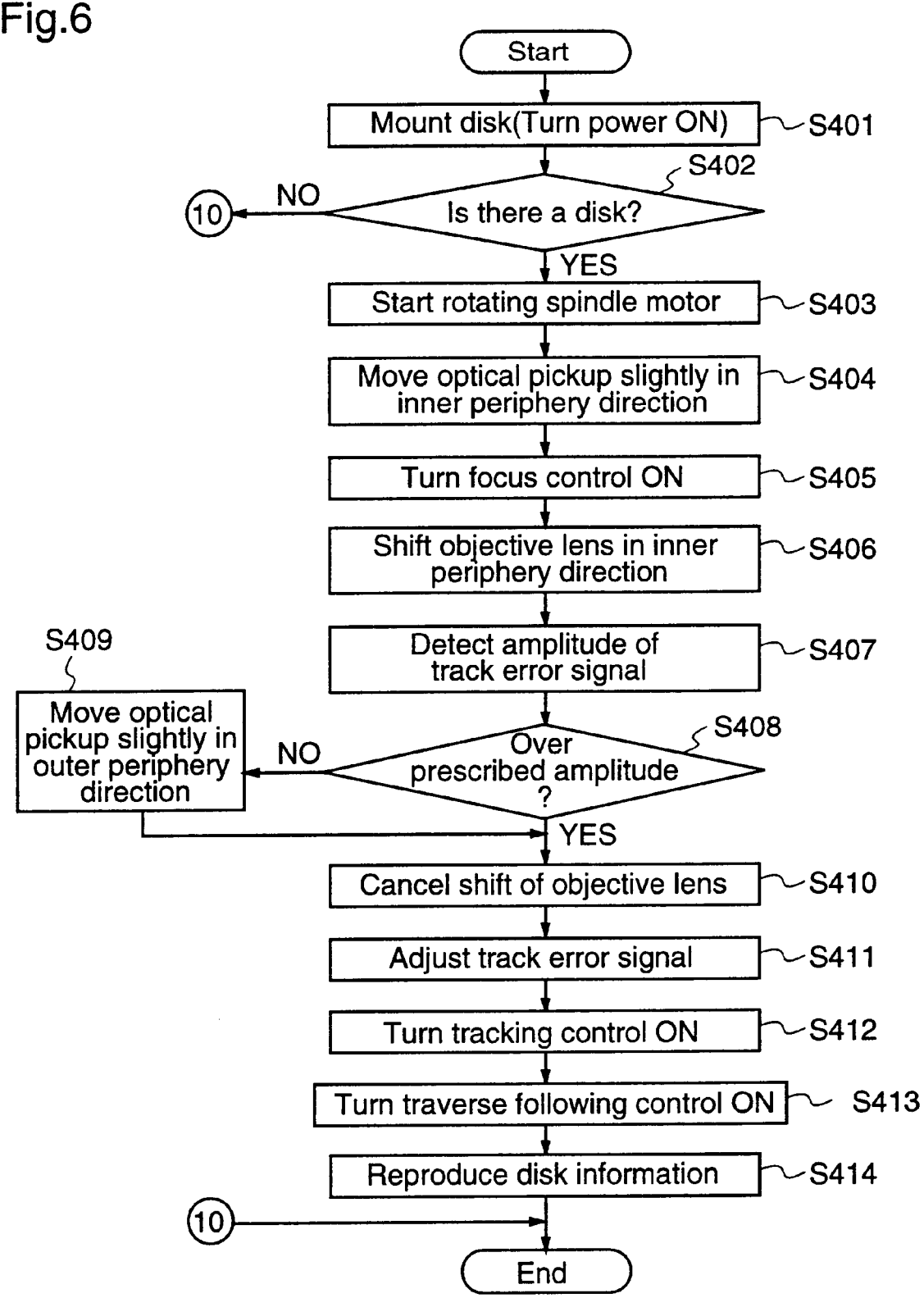
FIG. 6 is a flow chart for explaining the operation of the optical disk apparatus according to the fourth embodiment of the present invention.

FIG. 6 is a flow chart for explaining the operation of the optical disk apparatus according to the fourth embodiment of the present invention.

When the optical disk medium 2 is mounted on the optical disk apparatus or the power of the optical disk apparatus is turned ON (Step S401), a judgement whether the optical disk medium 2 is in the optical disk apparatus or not is performed (Step S402). A method of judging whether the optical disk medium 2 is in the optical disk apparatus or not is one by means of the level of the RF signal and inertia as described in the first embodiment, and its description will be omitted. When the optical disk medium 2 is judged to exist as the result of the judgement in Step S402, the spindle motor 16 is driven to start rotating the optical disk medium 2 (Step S403), and the optical pickup 1 is slightly moved in an inner periphery direction of the optical disk medium 2 (Step S404). The amount of the movement then in an inner periphery direction is one from a limit position of the movable range in which the optical pickup 1 can move to the outer periphery side up to entering the information area A2 of the optical disk medium 2 in which tracks are present. Thus, the optical pickup 1 is located inside the information area A2 or on the inner periphery side than the information area A2 by the above-described operation.

Subsequently, the MPU 6 shifts the objective lens of the optical pickup 1 to the inner periphery side of the optical disk medium 2 by the output signal Sig2 (Step S405), and the focus control is turned ON (Step S406). At this time, when the optical pickup 1 is located on the inner periphery side than the mirror surface area A30 at an inner periphery part of the optical disk medium 2, and an error state is generated in the focus control, a series of error processing operation as described in the first embodiment that the operation for initializing the position of the optical pickup 1 is performed and the TE signal is adjusted thereafter, which is not shown. Subsequently, when the optical pickup 1 is in the information area A2 or the mirror surface area A30 and the focus control is ON, signal amplitude of the TE signal is detected by the signal amplitude detecting circuit 17 (Step S407). Then, the detected output signal TEpp is compared with a prescribed amplitude signal level TEref by the comparator 18, so that whether the output signal TEpp is equal to or larger than the prescribed amplitude signal level TEref or not is judged (Step S408). The amplitude signal level TEref is set approximately to a level of noise on the TE signal generated by defects on the mirror surface part of the optical disk medium 2 or the like. As the result of the judgement in Step S408, when the output signal TEpp is equal to or larger than the prescribed amplitude signal level TEref, the comparator 18 outputs high level "1" as the output signal Sig1, and the processing proceeds to Step S410. On the other hand, as the result of the judgement in Step S408, when the output signal TEpp is under the prescribed amplitude signal level TEref, the comparator 18 outputs low level "0" as the output signal Sig1, and the processing proceeds to Step S409.

Here, when the position of the optical pickup 1 is at the boundary position P0 between the information area A2 where the track of the optical disk medium 2 exists and the mirror surface area A30 where no track exists as shown in FIG. 16, a laser beam of the optical pickup 1 crosses the boundary position P0 of the optical disk medium 2 due to eccentricity of the optical disk medium 2 or the deviation of the center at mounting or the like. Since the TE signal is not of an almost sine wave form but in a constant level when the laser beam goes into the mirror surface part, there is the possibility that amplitude of the original TE signal cannot be detected and an appropriate gain may not be set by the variable gain amplifier 72 that constructs the adjusting circuit 7, when the TE signal is adjusted at this position. Here, the amount of shifting the objective lens to the inner periphery side is set larger than the amount of eccentricity and deviation generated by eccentricity of the optical disk medium 2 or the deviation of the center at mounting, whereby the laser beam is emitted to the inner periphery side than an area where the track cross state is uncertain, and thus the laser beam certainly goes into the mirror surface part A30 and the detected signal Sig1 is low level "0", and the optical pickup 1 is slightly moved to the outer periphery side so that the optical pickup 1 is certainly moved inside the information area A2 (Step S409). On the other hand, when the position of the optical pickup 1 is slightly on the outer periphery side than the boundary position P0 between the information area A2 where the track of the optical disk medium 2 exists and the mirror surface area A30 where no track exists as shown in FIG. 16, the inner periphery shift of the objective lens is next canceled in either judgement (Step S410), while amplitude of the TE signal is detected in a state where the track cross state is uncertain since the objective lens of the optical pickup 1 is shifted to the inner periphery side as described above, whereby the laser beam certainly goes into the information area A2.

After the optical pickup 1 is moved to the information area A2 where the track of the optical disk medium 2 exists in the above-described Steps S408 and S409, the TE signal is adjusted (Step S411). When the tracking control is prepared to be operated accurately by the adjustment of the TE signal in Step S411, the tracking control is turned ON next (Step S412), and the traverse following control is subsequently turned ON so that the laser beam spot of the optical pickup 1 follows the spiral track on the optical disk medium 2 (Step S413). By this operation, the laser beam spot of the optical pickup 1 can accurately follow the track on the optical disk medium 2, whereby information in the optical disk medium 2 can be reproduced (Step S414).

As described above, in the optical disk apparatus according to the fourth embodiment, the amount of the optical pickup 1 moving at startup can be drastically decreased, resulting in drastic reduction of a startup time.

While, in the fourth embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this fourth embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 5)

FIG. 17 is a diagram illustrating a TE signal and TEA signal in track cross state, and also illustrates a period for which amplitude of the TE signal before adjustment is detected in an optical disk apparatus as defined in claim 5 of the present invention.

In a case where amplitude of the TE signal before adjustment is detected for a period from t10 to t20 in FIG. 17(a) in the above-described first to fourth embodiments of the present invention, the laser beam spot does not completely cross the track, resulting in an error in the detection of the signal amplitude. On the other hand, when the amplitude of the TE signal before adjustment is detected for a period from t1 to t2 or more in FIG. 17(a), that is, the amplitude of the TE signal is detected for a period of one rotation or more in synchronization with the rotation of the optical disk medium 2, the laser beam certainly crosses the track on the optical disk medium 2 due to eccentricity of the optical disk medium 2, or eccentricity by the deviation of the center at mounting and the like. Therefore, no error is generated in the detection of signal amplitude.

As described in the optical disk apparatus according to the fifth embodiment, amplitude of the TE signal is detected for a period of one rotation or more in synchronization with the rotation of the optical disk medium, whereby the amplitude of the TE signal can be certainly detected.

(Embodiment 6)

Figure 7:
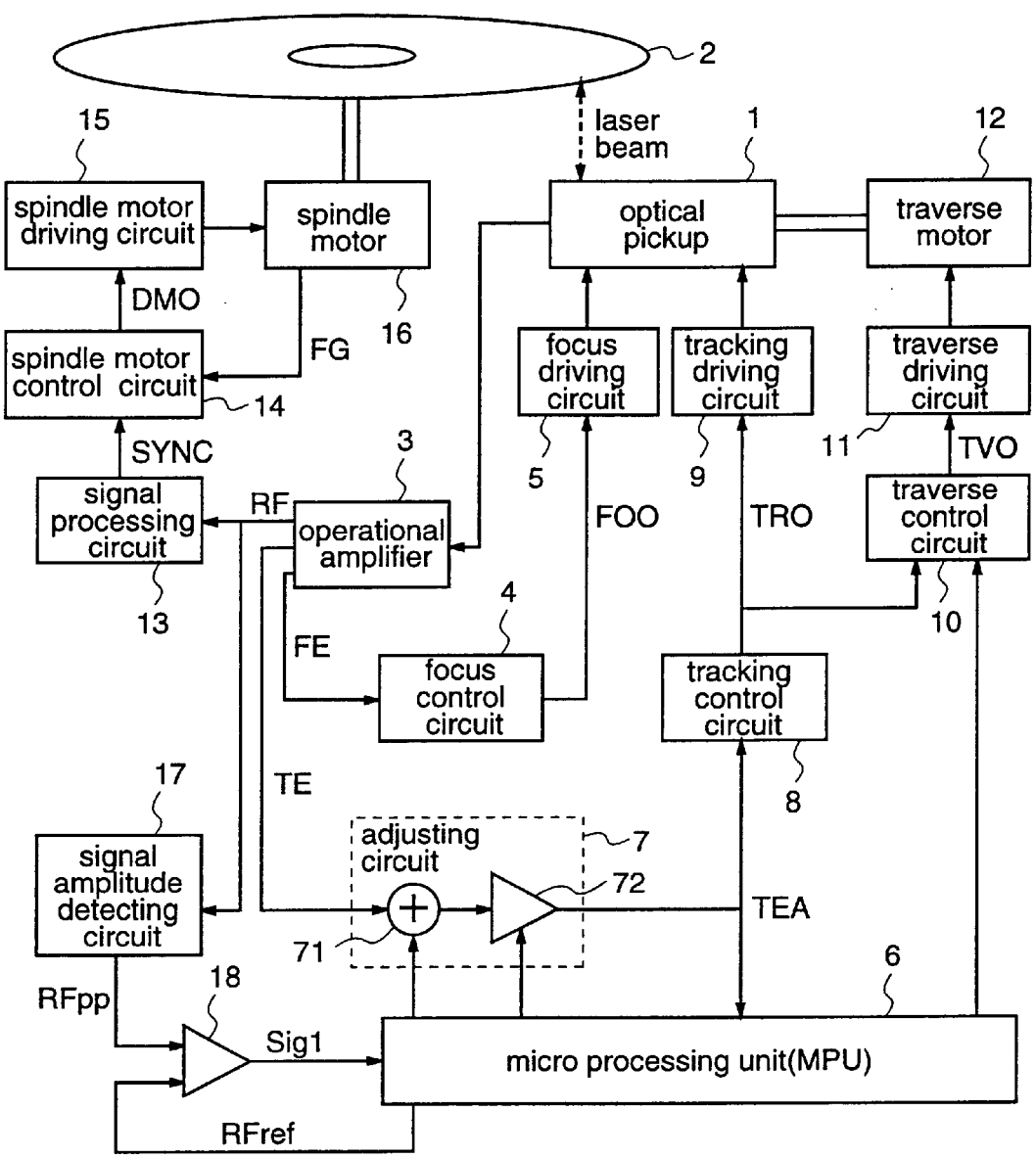
FIG. 7 is a block diagram illustrating a constitution of an optical disk apparatus according to a sixth embodiment of the present invention.

FIG. 7 is a block diagram illustrating a constitution of an optical disk apparatus according to a sixth embodiment of the present invention.

In FIG. 7, numeral 17 denotes a signal amplitude detecting circuit which is a means for detecting amplitude of the RF signal representing a returned light quantity signal from the optical disk medium 2, which outputs an output signal RFpp. Further, the signal amplitude detecting circuit 17 comprises a peak hold circuit, bottom hold circuit, and a differential amplifier (all not shown). Numeral 18 denotes a comparator which compares the level of the output signal RFpp outputted from the signal amplitude detecting circuit 17 with a prescribed level signal RFref set by the MPU 6, and has its output signal Sig1 of the the comparator 18 inputted to the MPU 6. Other same component parts as those shown in FIG. 1 are denoted by the same reference numerals, and their descriptions will be omitted.

Next, the operation of the optical disk apparatus according to the sixth embodiment will be described.

Figure 8:
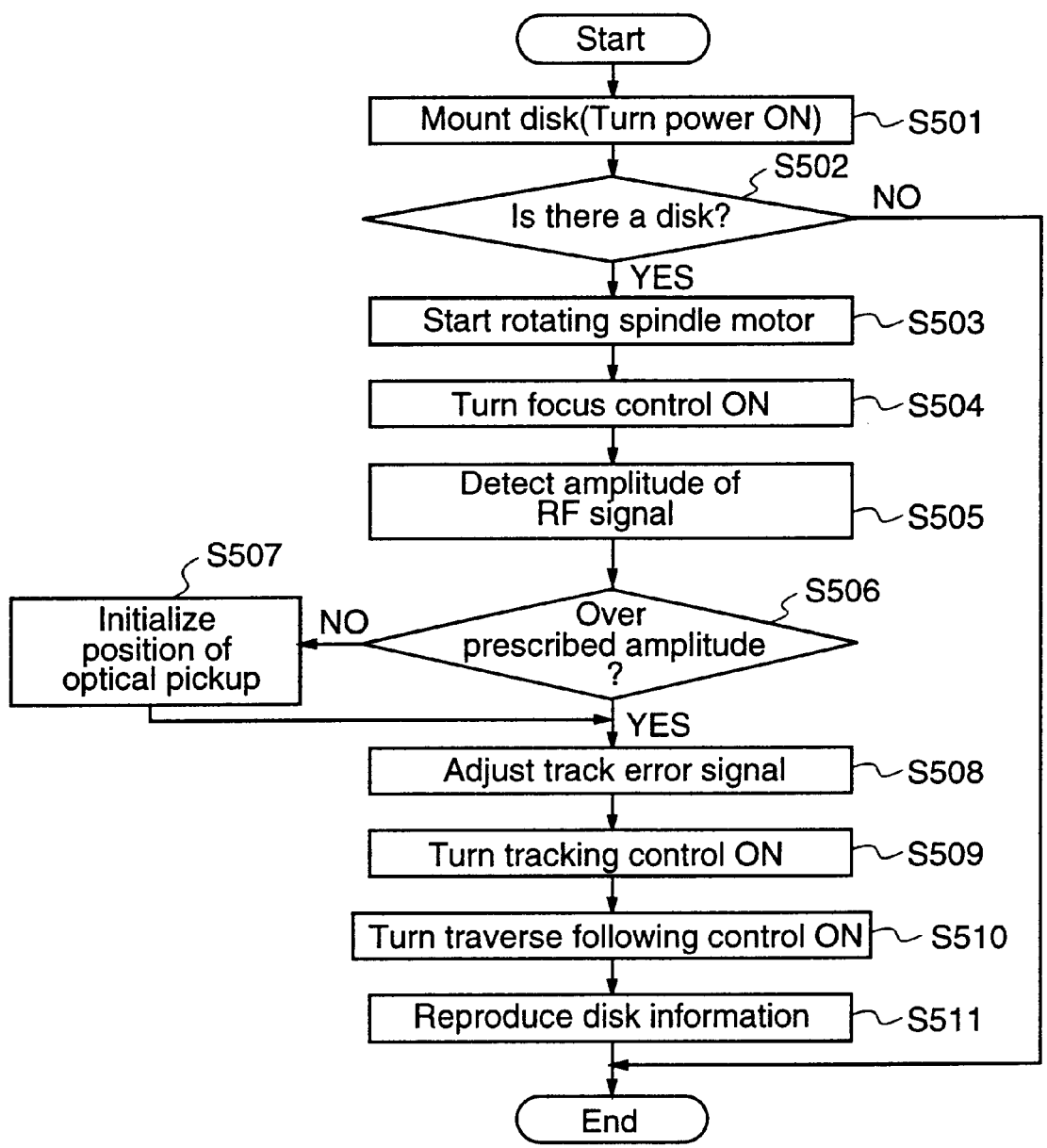
FIG. 8 is a flow chart for explaining the operation of the optical disk apparatus according to the sixth embodiment of the present invention.

FIG. 8 is a flow chart for explaining the operation of the optical disk apparatus according to the sixth embodiment of the present invention.

When the optical disk medium 2 is mounted on the optical disk apparatus or the power of the optical disk apparatus is turned ON (Step S501), a judgement whether the optical disk medium 2 is in the optical disk apparatus or not is performed (Step S502). A method of judging whether the optical disk medium 2 is in the optical disk apparatus or not is one by means of the level of the RF signal and inertia as described in the first embodiment, and its description will be omitted. When the optical disk medium 2 is judge to exist as the result of the judgement in Step S502, the spindle motor 16 is driven to start rotating the optical disk medium 2 (Step S503), and the focus control of the optical pickup 1 is turned ON (Step S504). At this time, when the position of the optical pickup 1 is in the information area A2 where the track of the optical disk medium 2 exists as shown in FIG. 16, a collected laser beam spot, the track error signal, goes into track cross state as shown in FIG. 17 due to eccentricity of the optical disk medium 2 or the deviation of the center at mounting or the like. On the other hand, when the position of the optical pickup 1 is in the mirror surface areas A30 and A31 where the track of the optical disk medium 2 does not exist as shown in FIG. 16, the TE signal is not of an almost sine wave form as shown in FIG. 17 but in a constant level because tracks are crossed, while the focus control is operated normally. In a case where the optical disk medium 2 is a recordable optical disk medium such as a CD-R or a CD-RW, an unrecorded area exists also in the information area where the track exists.

The RF signal and TE signal in a recorded part and unrecorded part in the track cross state are described in FIG. 9.

Figure 9A:
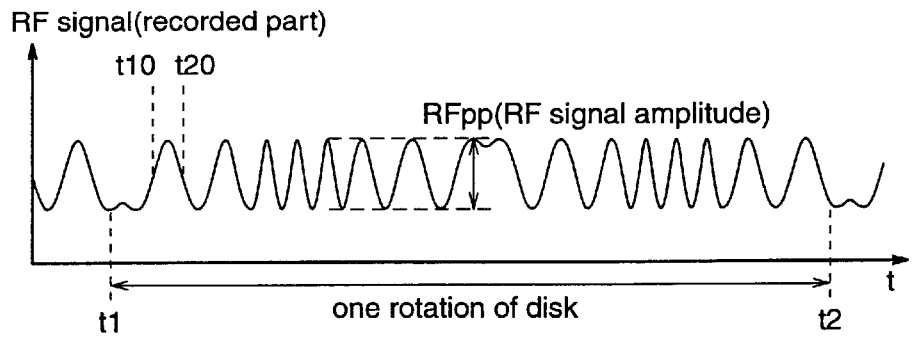
FIG. 9 is a diagram illustrating an RF signal and TE signal of a recorded part and unrecorded part in track cross state.
Figure 9B:
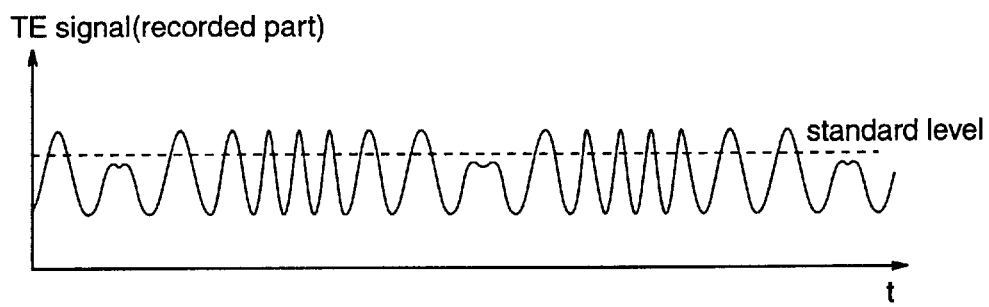
Figure 9C:
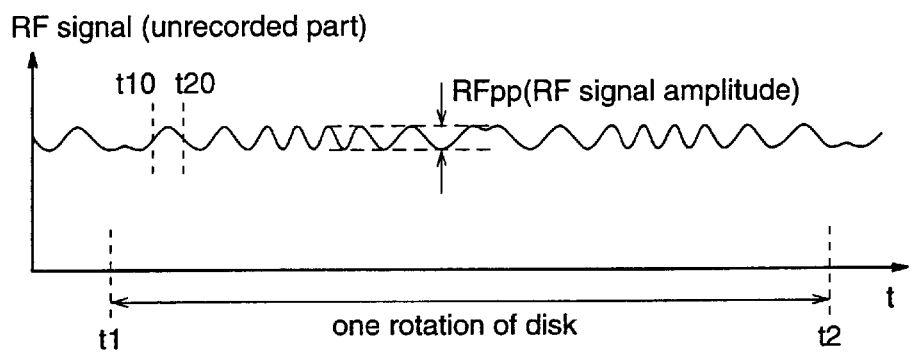
Figure 9D:
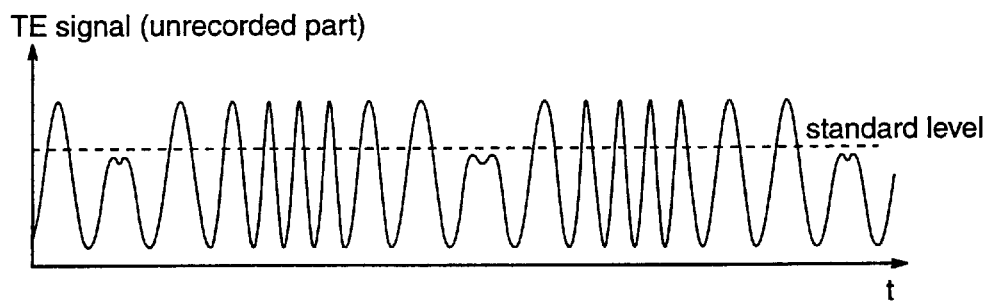

In the recorded part, since the track on the optical disk medium 2 is recorded with reflectance being modulated, large amplitude is obtained for the signal amplitude of the RF signal (see FIG. 9(a)). In the unrecorded part, since the track on the optical disk medium 2 has the reflectance that is not modulated, a small amplitude is obtained for the signal amplitude of the RF signal (see FIG. 9(c)). However, signal amplitude of the TE signal in the unrecorded part (See FIG. 9(d)) is larger than signal amplitude of the TE signal in the recorded part (See FIG. 9(b)). There exists the optical disk medium 2 having the signal amplitude of the TE signal in the unrecorded part which is almost twice as large as the signal amplitude in the recorded part. Here, in a case where the optical disk apparatus according to the present invention is a reproduce-only apparatus which only performs reproduction from the optical disk medium 2, there is no need to turn the tracking control ON in the unrecorded part of the optical disk medium, and therefore it is preferable that gain adjustment of the TE signal is performed in the recorded part.

Subsequently, after the focus control is turned ON in Step S504, the signal amplitude of the RF signal is detected by the signal amplitude detecting circuit 17 (Step S505). Then, the detected output signal RFpp is compared with a prescribed amplitude signal level RFref by the comparator 18, so that whether the output signal RFpp is equal to or larger than the prescribed signal amplitude level RFref or not is judged (Step S506). The amplitude signal level RFref is set larger than the level of the RF signal amplitude detected in the unrecorded part of the optical disk medium 2. As the result of the judgement in Step S506, when the output signal RFpp is equal to or larger than the prescribed amplitude signal level RFref, the comparator 18 outputs high level "1" as the output signal Sig1, and the processing proceeds to Step S508. On the other hand, as the result of the judgement in Step S506, when the output signal RFpp is under the prescribed amplitude signal level RFref, the comparator 18 outputs low level "0" as the output signal Sig1, and the processing proceeds to Step S507. Thus, when the output signal Sig1 is "1", the MPU 6 judges the optical pickup 1 is in the recorded part of the information area A2 where the track of the optical disk medium 2 exists and is in a normal track cross state, and adjusts a next track error signal (Step S108), while, when the signal Sig1 is "0", the MPU 6 judges the optical pickup 1 is in the unrecorded part of the information area A2 where the track of the optical disk medium 2 exists or in the mirror surface areas A30 and A31 and is not in a normal track cross state, and performs the operation for initializing the position of the optical pickup (Step 507), and then adjusts the TE signal (Step S508). The focus control is turned OFF at the beginning of the positional initialization of the optical pickup 1 and the focus control is turned ON again at the end of the positional initialization setting.

Since the tracking control is prepared to be operated accurately by the adjustment of the TE signal in Step S508, the tracking control is turned ON next (Step S509), and a traverse following control is subsequently turned ON so that the laser beam spot of the optical pickup 1 follows the spiral track on the optical disk medium 2 (Step S510). Thus, the laser beam spot of the optical pickup 1 can accurately follow the track on the optical disk medium 1, thereby reproducing information on the optical disk medium 2 (Step S511).

As described above, in the optical disk apparatus according to the sixth embodiment, the movement of the optical pickup 1 to the initialized position at start-up is not performed when the optical pickup 1 at start-up is located in the recorded area of the information area A2 where the track on the optical disk medium 2 exists, whereby the start-up time can be drastically shorten in most cases.

While, in the sixth embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this sixth embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 7)

Figure 10:
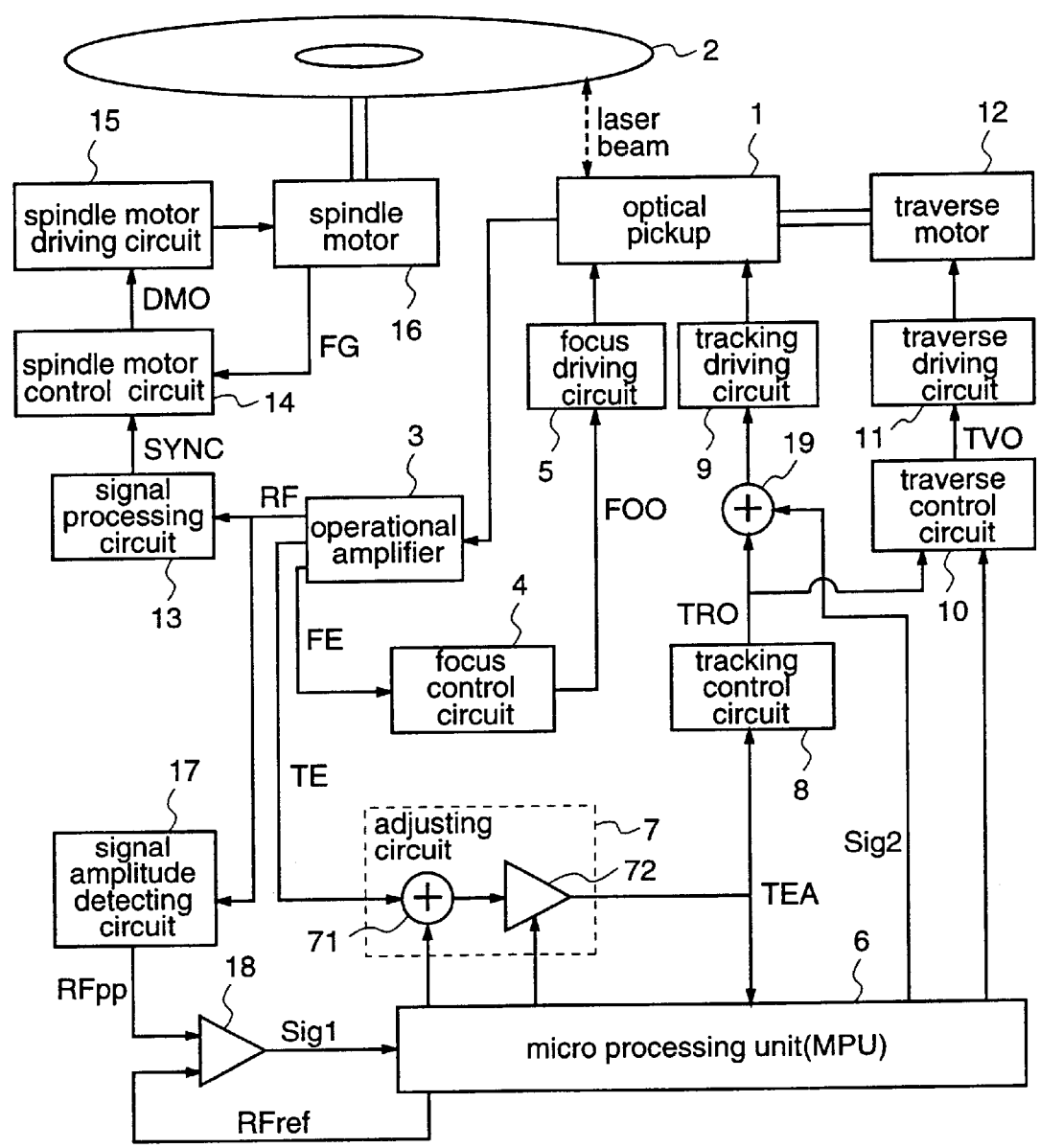
FIG. 10 is a block diagram illustrating a constitution of an optical disk apparatus according to a seventh to a ninth embodiments of the present invention.

FIG. 10 is a block diagram illustrating a constitution of an optical disk apparatus according to a seventh embodiment of the present invention.

In FIG. 10, numeral 19 denotes an adder which adds an output signal Sig2 of the MPU 6 and an output signal TRO of the tracking control circuit 8 for driving a tracking actuator of the optical pickup 1 by the tracking driving circuit 9. The adder 19 can forcibly shift an objective lens of the optical pickup 1 in a radial direction of the optical disk medium 2 by the output signal Sig2 of the MPU 6. Other same component parts as those shown in FIG. 7 are denoted by the same reference numerals, and their descriptions will be omitted.

Next, the operation of the optical disk apparatus according to the seventh embodiment will be described.

Figure 11:
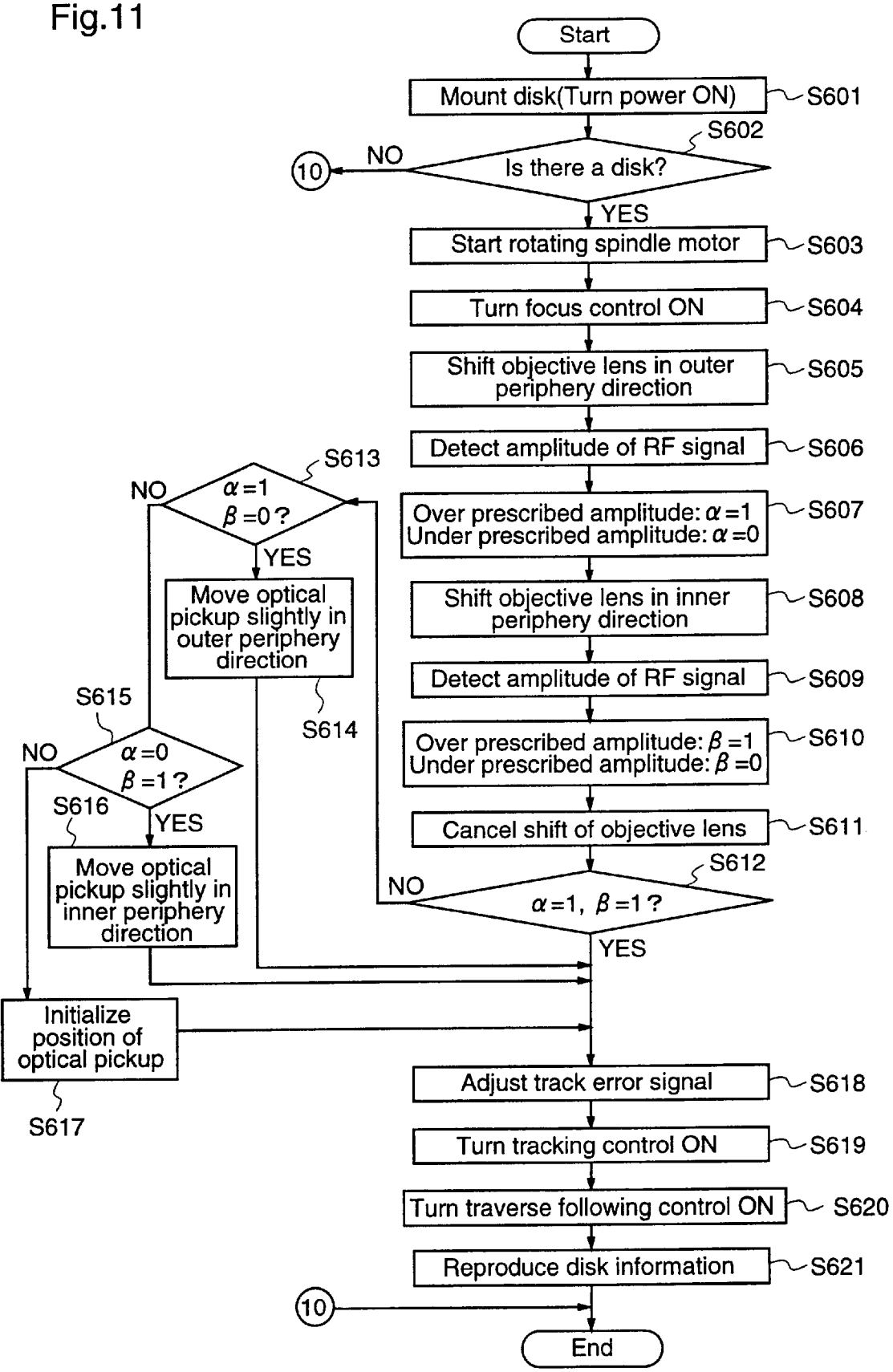
FIG. 11 is a flow chart for explaining the operation of the optical disk apparatus according to the seventh embodiment of the present invention.

FIG. 11 is a flow chart for explaining the operation of the optical disk apparatus according to the seventh embodiment of the present invention.

When the optical disk medium 2 is mounted on the optical disk apparatus or the power of the optical disk apparatus is turned ON (Step S601), a judgement whether the optical disk medium 2 is in the optical disk apparatus or not is performed (Step S602). A method of judging whether the optical disk medium 2 is in the optical disk apparatus or not is one by means of the level of the RF signal and inertia as described in the first embodiment, and its description will be omitted. When the optical disk medium 2 is judge to exist as the result of the judgement in Step S602, the spindle motor 16 is driven to start rotating the optical disk medium 2 (Step S603), and the focus control of the optical pickup 1 is turned ON (Step S604). On the other hand, when the optical disk medium 2 is judged not to exist as the result of the judgement in Step S602, the operation is terminated. In Step S604, when the position of the optical pickup 1 is in the information area A2 where the track of the optical disk medium 2 exists as shown in FIG. 16 with the focus control of the optical pickup 1 ON, a collected laser beam spot goes into track cross state as shown in FIG. 17 due to eccentricity of the optical disk medium 2 or the deviation of the center at mounting or the like. On the other hand, when the position of the optical pickup 1 is in the mirror surface areas A30 and A31 where the track of the optical disk medium 2 does not exist as shown in FIG. 16, the TE signal is not of an almost sine wave form as shown in FIG. 17 but in a constant level because tracks are not crossed, while the focus control is operated normally. The RF signal amplitude and the TE signal amplitude have different levels in the recorded part and unrecorded part in the information area A2 as shown in FIG. 9.

Subsequently, the MPU 6 shifts the objective lens of the optical pickup 1 to the outer periphery side of the optical disk medium 2 by the output signal Sig2 (Step S605). In this state, signal amplitude of the RF signal is detected by the signal amplitude detecting circuit 17 (Step S606), and the detected signal RFpp is compared with a prescribed amplitude signal level RFref by the comparator 18. At the time, the prescribed amplitude signal level RFref is set larger than the level of the RF signal amplitude detected in the unrecorded part of the optical disk medium 2. As the result of the comparison in the comparator 18, when the output signal RFpp is equal to or larger than the prescribed amplitude signal level RFref, the comparator 18 outputs high level "1" as the output signal Sig1, while, when the output signal RFpp is under the prescribed amplitude signal level RFref, the comparator 18 outputs low level "0" as the output signal Sig1. The MPU 6 holds this detected value as a variable a (Step S607).

Next, the MPU 6 shifts the objective lens of the optical pickup 1 to the inner periphery side of the optical disk medium 2 by the output signal Sig2 (Step S608). In this state, signal amplitude of the RF signal is detected by the signal amplitude detecting circuit 17 (Step S609), and the detected signal RFpp is compared with a prescribed amplitude signal level RFref, which is set larger than the level of the RF signal amplitude detected in the unrecorded part of the optical disk medium 2, by the comparator 18. As the result of the comparison in the comparator 18, when the output signal RFpp is equal to or larger than the prescribed amplitude signal level RFref, the comparator 18 outputs high level "1" as the output signal Sig1, while, when the output signal RFpp is under the prescribed amplitude signal level RFref, the comparator 18 outputs low level "0" as the output signal Sig1. The MPU 6 holds this detected value as a variable β (Step S610) and cancels the shift of the objective lens (Step S611).

When the optical pickup 1 is located either at a boundary position P0 as a boundary between the information area A2 where the track of the optical disk medium 2 exists and the mirror surface area A30 where no track exists or at a boundary position P1 as a boundary between the information area A2 where the track exists and the mirror surface area A31, as shown in FIG. 16, a laser beam of the optical pickup 1 crosses the boundary position P0 or boundary position P1 of the optical disk medium 2 due to eccentricity of the optical disk medium 2 or the deviation of the center at mounting or the like. Since the TE signal is not of an almost sine wave form but in a constant level when the laser beam goes into the mirror surface part, there is the possibility that amplitude of the original TE signal cannot be detected and an appropriate gain may not be set by the variable gain amplifier 72 that constructs the adjusting circuit 7, when the TE signal is adjusted at this position. Here, the above-described outer periphery shift amount and inner periphery shift amount of the objective lens are set larger than the amount of eccentricity and deviation generated by eccentricity of the optical disk medium 2 or the deviation of the center at mounting, whereby the amplitude of the RF signal before adjustment is detected at two positions beyond a range of an area where the track cross state is uncertain, and more detailed positions of the optical pickup 1 and of the optical disk medium 2 can be judged by the variable $\alpha$ and variable $\beta$ as the detected values. In a case where the optical disk medium 2 is a recordable optical disk medium 1 such as a CD-R or a CD-RW, an area which can be judged by the variable $\alpha$ and variable $\beta$ as the detected values is the area of the recorded part and unrecorded part in the information area A2 of the optical disk medium 2, when the unrecorded part exists in the information area A2 where the track exists.

Subsequently, it is judged whether the detected values are $\alpha$="1" as well as $\beta$="1" or not in step S612. When the detected values are $\alpha$="1" as well as $\beta$="1" as the result of the judgement, the optical pickup 1 is entirely located in the recorded part of the information area A2, and a certain track cross state can be obtained, whereby the TE signal is adjusted at this position (Step S618). On the other hand, when the detected values are not $\alpha$="1" as well as $\beta$="1" in Step S612, it is judged whether the detected values are $\alpha$="1" as well as $\beta$="0" or not (Step S613). When the detected values are $\alpha$="1" as well as $\beta$="0" as the result of the judgement, the optical pickup 1 is located at a boundary position between the recorded part and the unrecorded part because the RF signal amplitude level is not obtained when the objective lens is shifted to the inner periphery side. Then, the optical pickup 1 is slightly moved to the outer periphery side so that a certain track cross state is obtained (Step S614), and the TE signal is adjusted. On the other hand, when the detected values are not $\alpha$="1" as well as $\beta$="0" in Step S613, it is judged whether the detected values are $\alpha$="0" as well as $\beta$="1" or not (Step S615). When the detected values are $\alpha$="0" as well as $\beta$="1" as the result of the judgement, the optical pickup 1 is located at a boundary position between the recorded part and the unrecorded part because the RF signal amplitude level is not obtained when the objective lens is shifted to the outer periphery side. Then, the optical pickup 1 is slightly moved to the inner periphery side so that a certain track cross state is obtained (Step S616), and the TE signal is adjusted. On the other hand, when the detected values are not $\alpha$="0" as well as $\beta$="1" in Step S615, which means they are $\alpha$="0" as well as $\beta$="0", the optical pickup 1 is located in a part other than the recorded area, and the operation for initializing the position of the optical pickup 1 is performed (Step S617).

After the optical pickup 1 is moved to the information area A2 where the track of the optical disk medium 2 exists in the above-described Steps S612 to S617, the TE signal is adjusted (Step S618). The focus control is turned OFF at the beginning of the positional initialization of the optical pickup 1 and the focus control is turned ON again after the operation of the positional initialization is terminated. Also, when the optical pickup 1 is located at a boundary position between the mirror surface area A30 and the substrate area A40 or at a boundary position between mirror surface area A31 and the substrate area A41 in the optical medium 2 as shown in FIG. 16, and an error status is generated in the focus control by the above-described outer periphery shift operation and inner periphery shift operation of the objective lens, the operation for initializing the position of the optical pickup 1 is performed to move the optical pickup 1 to the information area A2 where the track of the optical disk medium 2 exists, and then the TE signal is adjusted (Step S218).

Next, since the tracking control is prepared to be operated accurately by the adjustment of the TE signal, the tracking control is turned ON (Step S619), and the traverse following control is subsequently turned ON so that the laser beam spot of the optical pickup 1 follows the spiral track on the optical disk medium 2 (Step S620). By this operation, the laser beam spot of the optical pickup 1 can accurately follow the track on the optical disk medium 2, whereby information on the optical disk medium 2 can be reproduced (Step S621).

As described above, in the optical disk apparatus according to the seventh embodiment, amplitude of the RF signal is detected, two detected values (variables $\alpha$ and $\beta$) are compared with previously set prescribed amplitude, it is judged as the result of the comparison whether the optical pickup is located entirely in the recorded part in the area where the track on the optical disk medium exists, it is located at an end on the outer periphery side of the recorded part, it is located at an end on the inner periphery side of the recorded part, or it is located entirely outside the recorded part, so as to decide whether the optical pickup needs to be moved before the adjusting operation of the track error signal is performed or not, and the optical pickup 1 can be moved to the most appropriate direction also when the movement is judged to be required, whereby the movement of the optical pickup can be optimized at start-up, resulting in drastic reduction of a startup time.

While, in the seventh embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this seventh embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 8)

FIG. 10 is a block diagram illustrating a constitution of an optical disk apparatus according to an eighth embodiment of the present invention. Respective constitutions in the figure are described in the seventh embodiment, and their descriptions will be omitted.

Next, the operation of the optical disk apparatus according to the eighth embodiment will be described.

Figure 12:
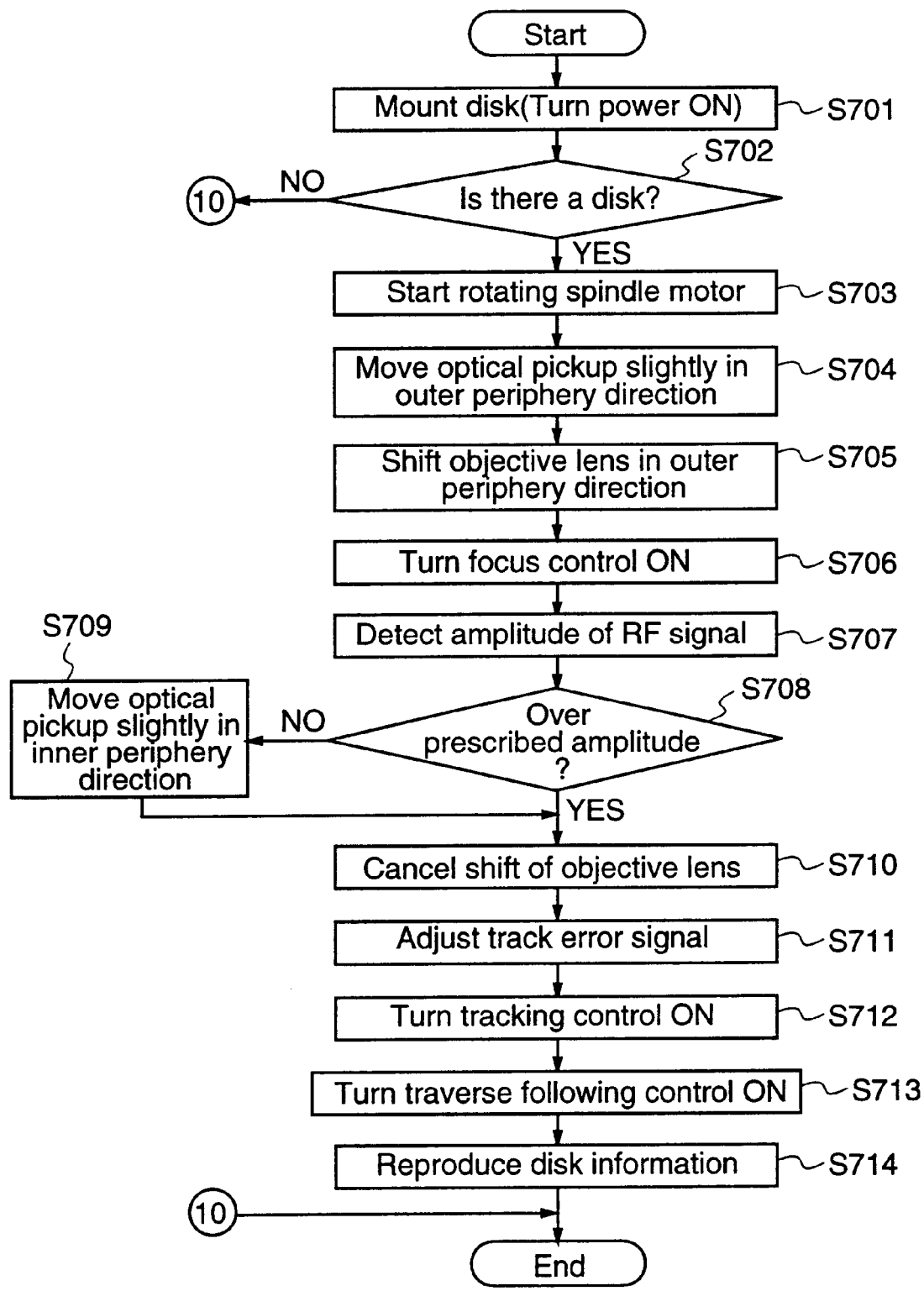
FIG. 12 is a flow chart for explaining the operation of the optical disk apparatus according to the eighth embodiment of the present invention.

FIG. 12 is a flow chart for explaining the operation of the optical disk apparatus according to the eighth embodiment of the present invention.

When the optical disk medium 2 is mounted on the optical disk apparatus or the power of the optical disk apparatus is turned ON (Step S701), a judgement whether the optical disk medium 2 is in the optical disk apparatus or not is performed (Step S702). A method of judging whether the optical disk medium 2 is in the optical disk apparatus or not is one by means of the level of the RF signal and inertia as described in the first embodiment, and its description will be omitted. When the optical disk medium 2 is judged to exist as the result of the judgement in Step S702, the spindle motor 16 is driven to start rotating the optical disk medium 2 (Step S703), and the optical pickup 1 is slightly moved in an outer periphery direction (Step S704). The amount of the movement then in an outer periphery direction is one from a limit position of the movable range in which the optical pickup 1 can move to the inner periphery side up to entering the information area A2 of the optical disk medium 2 in which the tracks are present. The optical pickup 1 is located inside the information area A2 where the track of the optical disk medium 2 exists or on the outer periphery side than the information area A2 as shown in FIG. 16.

Subsequently, the MPU 6 shifts the objective lens of the optical pickup 1 to the outer periphery side by the output signal Sig2 (Step S705), and the focus control is turned ON (Step S706). At this time, when the optical pickup 1 is located on the outer periphery side than the mirror surface area A31 at an outer periphery part of the optical disk medium 2, and an error state is generated in the focus control, a series of error processing operation that the operation for initializing the position of the optical pickup 1 is performed and the TE signal is adjusted thereafter, which is not shown. Subsequently, when the optical pickup 1 is in the information area A2 or the mirror surface area A31 and the focus control is ON, signal amplitude of the RF signal is detected by the signal amplitude detecting circuit 17 (Step S707). Then, the detected output signal RFpp is compared with a prescribed amplitude signal level RFref by the comparator 18, so that whether the output signal RFpp is equal to or larger than the prescribed amplitude signal level RFref or not is judged (Step S708). The amplitude signal level RFref is set larger than the level of the RF signal amplitude detected in the unrecorded part of the optical disk medium 2. As the result of the judgement in Step S708, when the output signal RFpp is equal to or larger than the prescribed amplitude signal level RFref, the comparator 18 outputs high level "1" as the output signal Sig1, and the processing proceeds to Step S710. On the other hand, as the result of the judgement in Step S708, when the output signal RFpp is under the prescribed amplitude signal level RFref, the comparator 18 outputs low level "0" as the output signal Sig1, and the processing proceeds to Step S709.

Here, when the position of the optical pickup 1 is at a boundary between the recorded part and the unrecorded part of the information area A2 where the track of the optical disk medium 2 exists as shown in FIG. 16, a laser beam of the optical pickup 1 crosses the boundary position P1 of the optical disk medium 2 due to eccentricity of the optical disk medium 2 or the deviation of the center at mounting or the like. When the laser beam goes into the unrecorded part, the TE signal has larger amplitude than that in the recorded part, and thus, there is the possibility that amplitude of the original TE signal cannot be detected and an appropriate gain may not be set by the variable gain amplifier 72 that constructs the adjusting circuit 7, when the TE signal is adjusted at this position. Here, the amount of shifting the objective lens to the outer periphery side is set larger than the amount of eccentricity and deviation generated by eccentricity of the optical disk medium 2 or the deviation of the center at mounting, whereby the laser beam is emitted to the outer periphery side than an area where the track cross state is uncertain, and thus the laser beam certainly goes into the unrecorded part and the detected signal Sig1 is low level "0", and the optical pickup 1 is slightly moved to the inner periphery side so that the optical pickup 1 is certainly moved inside the information area A2 (Step S709). On the other hand, when the position of the optical pickup 1 is slightly on the inner periphery side than the boundary position between the recorded part and the unrecorded part of the information area A2 where the track of the optical disk medium 2 exists as shown in FIG. 16, the outer periphery shift of the objective lens is next canceled in either judgement (Step S710), while amplitude of the RF signal is detected in a state where the track cross state is uncertain since the objective lens of the optical pickup 1 is shifted to the outer periphery side, whereby the laser beam certainly goes into the recorded area of the information area A2.

After the outer periphery shift of the objective lens is canceled in Step S710, the TE signal is adjusted (Step S711). When the tracking control is prepared to be operated accurately by the adjustment of the TE signal in Step S711, the tracking control is turned ON next (Step S712), and the traverse following control is subsequently turned ON so that the laser beam spot of the optical pickup 1 follows the spiral track on the optical disk medium 2 (Step S713). Thus, the laser beam spot of the optical pickup 1 can accurately follow the track on the optical disk medium 2, whereby information in the optical disk medium 2 can be reproduced (Step S714).

As described above, in the optical disk apparatus according to the eighth embodiment, the amount of the optical pickup moving at startup can be drastically decreased, resulting in drastic reduction of a startup time.

While, in the eighth embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this eighth embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 9)

FIG. 10 is a block diagram illustrating a constitution of an optical disk apparatus according to an ninth embodiment of the present invention. Respective constitutions in the figure are described in the seventh embodiment, and their descriptions will be omitted.

Next, the operation of the optical disk apparatus according to the ninth embodiment will be described.

Figure 13:
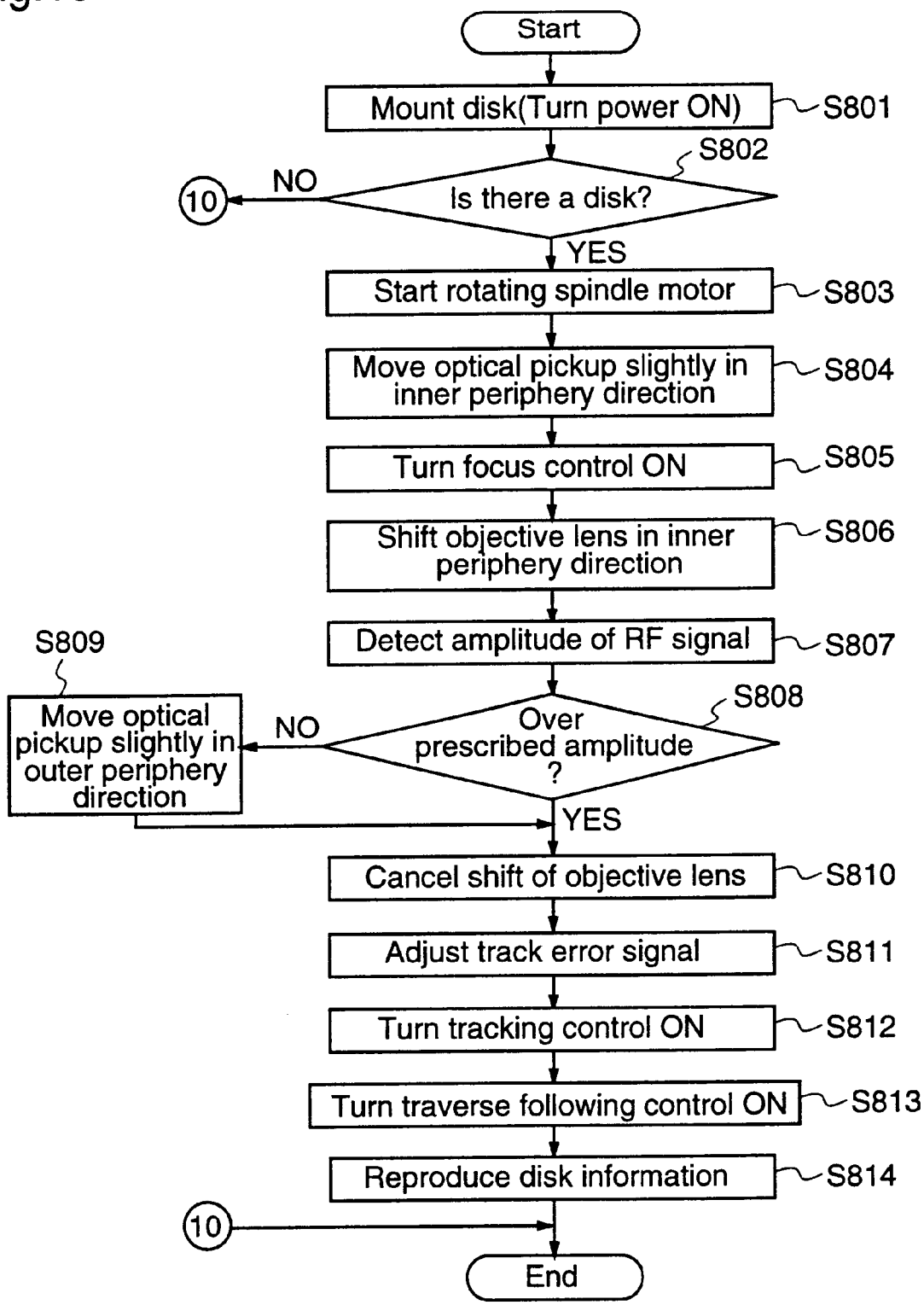
FIG. 13 is a flow chart for explaining the operation of the optical disk apparatus according to a ninth embodiment of the present invention.

FIG. 13 is a flow chart for explaining the operation of the optical disk apparatus according to the ninth embodiment of the present invention.

When the optical disk medium 2 is mounted on the optical disk apparatus or the power of the optical disk apparatus is turned ON (Step S801), a judgement whether the optical disk medium 2 is in the optical disk apparatus or not is performed (Step S802). A method of judging whether the optical disk medium 2 is in the optical disk apparatus or not is one by means of the level of the RF signal and inertia as described in the first embodiment, and its description will be omitted. When the optical disk medium 2 is judged to exist as the result of the judgement in Step S802, the spindle motor 16 is driven to start rotating the optical disk medium 2 (Step S803), and the optical pickup 1 is slightly moved in an inner periphery direction (Step S804). The amount of the movement then in an inner periphery direction is one from a limit position of the movable range in which the optical pickup 1 can move to the outer periphery side up to entering the information area A2 of the optical disk medium 2 in which tracks are present. Thus, the optical pickup 1 is located inside the information area A2 or on the inner periphery side than the information area A2 in FIG. 16 by the above-described operation.

Subsequently, the MPU 6 shifts the objective lens of the optical pickup 1 to the inner periphery side of the optical disk medium 2 by the output signal Sig2 (Step S805), and the focus control is turned ON (Step S806). At this time, when the optical pickup 1 is located on the inner periphery side than the mirror surface area A30 at an inner periphery part of the optical disk medium 2, and an error state is generated in the focus control, a series of error processing operation that the operation for initializing the position of the optical pickup 1 is performed and the TE signal is adjusted thereafter, which is not shown. Subsequently, when the optical pickup 1 is in the information area A2 or the mirror surface area A30 and the focus control is ON, signal amplitude of the RF signal is detected by the signal amplitude detecting circuit 17 (Step S807). Then, the detected output signal RFpp is compared with a prescribed amplitude signal level RFref by the comparator 18, so that whether the output signal RFpp is equal to or larger than the prescribed amplitude signal level RFref or not is judged (Step S808). The amplitude signal level RFref is set larger than the level of the RF signal amplitude detected in the unrecorded part of the optical disk medium 2. As the result of the judgement in Step S808, when the output signal RFpp is equal to or larger than the prescribed amplitude signal level RFref, the comparator 18 outputs high level "1" as the output signal Sig1, and the processing proceeds to Step S810. On the other hand, as the result of the judgement in Step S808, when the output signal RFpp is under the prescribed amplitude signal level RFref, the comparator 18 outputs low level "0" as the output signal Sig1, and the processing proceeds to Step S809.

Here, when the position of the optical pickup 1 is at a boundary between the recorded part and the unrecorded part of the information area A where the track of the optical disk medium 2 exists as shown in FIG. 16, a laser beam of the optical pickup 1 crosses the boundary position P0 of the optical disk medium 2 due to eccentricity of the optical disk medium 2 or the deviation of the center at mounting or the like. When the laser beam goes into the unrecorded part, the TE signal has larger amplitude than that in the recorded part, and thus, there is the possibility that amplitude of the TE signal in the recorded part which performs the original operation cannot be detected and an appropriate gain may not be set by the variable gain amplifier 72 that constructs the adjusting circuit 7, when the TE signal is adjusted at this position. Here, the amount of shifting the objective lens to the inner periphery side is set larger than the amount of eccentricity and deviation generated by eccentricity of the optical disk medium 2 or the deviation of the center at mounting, whereby the laser beam is emitted to the outer periphery side than an area where the track cross state is uncertain, and thus the laser beam certainly goes into the unrecorded part and the detected signal Sig1 is low level "0", and the optical pickup 1 is slightly moved to the outer periphery side of the optical disk medium 2 (Step S809), so that the optical pickup 1 is certainly moved inside the information area A2. On the other hand, when the position of the optical pickup 1 is slightly on the outer periphery side than the boundary position P0 between the recorded part and the unrecorded part of the information area A2 where the track of the optical disk medium 2 exists as shown in FIG. 16, the inner periphery shift of the objective lens is next canceled in either judgement (Step S810), while amplitude of the RF signal is detected in a state where the track cross state is uncertain since the objective lens of the optical pickup 1 is shifted to the inner periphery side as described above, whereby the laser beam certainly goes into the information area A2.

After the optical pickup 1 is moved to the information area A2 where the track of the optical disk medium 2 exists in the above-described Steps S808 and S809, the TE signal is adjusted (Step S811). When the tracking control is prepared to be operated accurately by the adjustment of the TE signal in Step S811, the tracking control is turned ON next (Step S812), and the traverse following control is subsequently turned ON so that the laser beam spot of the optical pickup 1 follows the spiral track on the optical disk medium 2 (Step S813). Thus, the laser beam spot of the optical pickup 1 can accurately follow the track on the optical disk medium 2, whereby information in the optical disk medium 2 can be reproduced (Step S814).

As described above, in the optical disk apparatus according to the ninth embodiment, the amount of the optical pickup moving at startup can be drastically decreased, resulting in drastic reduction of a startup time.

While, in the ninth embodiment, in order to construct an amplitude detecting means for detecting amplitude of the TE signal and a means for comparing with a previously set value, the signal amplitude detecting circuit 17 and the comparator 18 are added to the conventional optical disk apparatus shown in FIG. 14, while this ninth embodiment may be also realized without adding the signal amplitude detecting circuit 17 and the comparator 18, by sampling the TEA signal in the MPU 6 with an initial value given to the adjusting circuit 7 and realizing the amplitude detecting means for detecting amplitude of the TE signal and the means for comparing with a previously set value in the MPU 6.

(Embodiment 10)

FIG. 9 is a diagram illustrating an RF signal and TE signal of a recorded part and unrecorded part in track cross state, which also illustrates a period for which amplitude of the RF signal is detected in an optical disk apparatus as defined in claim 10 of the present invention.

In a case where amplitude of the TE signal before adjustment is detected for a period from t10 to t20 in FIG. 9 in the above-described sixth to ninth embodiments, the laser beam spot does not completely cross the track, resulting in an error in the detection of the signal amplitude. On the other hand, when amplitude of the RF signal is detected for a period from t1 to t2 or more in FIG. 9, that is, for a period of one rotation or more in synchronization with the rotation of the optical disk medium 2, the laser beam spot certainly crosses the track on the optical disk medium 2 due to eccentricity of the optical disk medium 2 or eccentricity by the deviation of the center at mounting or the like, whereby no error is generated in the detection of signal amplitude.

As described in the optical disk apparatus according to the tenth embodiment, amplitude of the RF signal is detected for a period of one rotation or more in synchronization with the rotation of the optical disk medium, whereby the amplitude of the track error signal can be certainly detected.

While the optical disk apparatus in the first to tenth embodiments is described taking an optical disk apparatus which only performs reproduction of information for example, an optical disk apparatus such as CD-R or CD-RW, which also enables recording of information can be also applied, thereby to achieve the same effects as those in the embodiments.

APPLICABILITY IN INDUSTRY

As described above, an optical disk apparatus according to the present invention is suited to perform recording or reproduction of information into/from an optical disk.

What is claimed is:

1. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

an amplitude detecting means for detecting amplitude of the track error signal; and a transfer means for transferring the optical pickup in a radial direction of the optical disk medium, wherein the focus control means focuses the light beam irradiated from the optical pickup onto the optical disk medium, and the adjusting means adjusts the gain and offset of the track error signal when the amplitude of the track error signal detected by the amplitude detecting means is equal to or larger than a previously set value, while the optical pickup is transferred to a previously decided position when the amplitude of the track error signal detected by the amplitude detecting means is under the previously set value.

2. The optical disk apparatus as defined in claim 1, wherein the amplitude of the track error signal is detected by the amplitude detecting means for a period of one rotation or more in synchronization with the rotation of the optical disc medium.

3. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

an amplitude detecting means for detecting amplitude of the track error signal;

an objective lens shift means for providing a signal to the tracking driving means to shift an objective lens of the optical pickup in a radial direction of the optical disk medium; and a transfer means for transferring the optical pickup in the radial direction of the optical disk medium, wherein the focus control means focuses the light beam irradiated from the optical pickup onto the optical disk medium, and according to a first comparison result which is obtained by comparing amplitude of a first track error signal detected in the amplitude detecting means with a previously set value in a state where the objective lens of the optical pickup is shifted in an outer periphery direction of the optical disk medium by the objective lens shift means, as well as a second comparison result which is obtained by comparing amplitude of a second track error signal detected in the amplitude detecting means with the previously set value in a state where the objective lens of the optical pickup is shifted in an inner periphery direction of the optical disk medium by the objective lens shift means, the gain and offset of the track error signal are adjusted when the first and the second comparison results are both equal to or larger than the previously set value; the optical pickup is transferred in the outer periphery direction of the optical disk medium when the first comparison result is equal to or larger than the previously set value and the second comparison result is under the previously set value; the optical pickup is transferred in the inner periphery direction of the optical disk medium when the first comparison result is under the previously set value and the second comparison result is equal to or larger than the previously set value; and the optical pickup is transferred to a previously decided position when the first and the second comparison results are both under the previously set value.

4. The optical disk apparatus as defined in claim 3, wherein the amplitude of the track error signal is detected by the amplitude detecting means for a period of one rotation or more in synchronization with the rotation of the optical disc medium.

5. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

an amplitude detecting means for detecting amplitude of the track error signal;

an objective lens shift means for providing a signal to the tracking driving means to shift an objective lens of the optical pickup in a radial direction of the optical disk medium; and a transfer means for transferring the optical pickup in the radial direction of the optical disk medium, wherein the transfer means transfers the optical pickup in an outer periphery direction of the optical disk medium, the focus control means focuses the light beam irradiated from the optical pickup onto the optical disk medium, and shift of the objective lens is stopped and the adjusting means adjusts the gain and offset of the track error signal when the amplitude of the track error signal detected by the amplitude detecting means is equal to or larger than a previously set value in a state where the objective lens of the optical pickup is shifted in the outer periphery direction of the optical disk medium by the objective lens shift means, while the optical pickup is transferred in an inner periphery direction of the optical disk medium when the amplitude of the track error signal detected by the amplitude detecting means is under the previously set value.

6. The optical disk apparatus as defined in claim 5, wherein the amplitude of the track error signal is detected by the amplitude detecting means for a period of one rotation or more in synchronization with the rotation of the optical disc medium.

7. An optical disk apparatus which comprises: an optical pickup which performs recording or reproduction of information to an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

an amplitude detecting means for detecting amplitude of the track error signal;

an objective lens shift means for providing a signal to the tracking driving means to shift an objective lens of the optical pickup in a radial direction of the optical disk medium; and a transfer means for transferring the optical pickup in the radial direction of the optical disk medium, wherein the transfer means transfers the optical pickup in an inner periphery direction of the optical disk medium, the focus control means focuses the light beam irradiated from the optical pickup onto the optical disk medium, and shift of the objective lens is stopped and the gain and offset of the track error signal are adjusted by the adjusting means when the amplitude of the track error signal detected by the amplitude detecting means is equal to or larger than a previously set value in a state where the objective lens shift means shifts the objective lens of the optical pickup in the inner periphery direction of the optical disk medium, while the optical pickup is transferred in an outer periphery direction of the optical disk medium when the amplitude of the track error signal detected by the amplitude detecting means is under the previously set value.

8. The optical disk apparatus as defined in claim 7, wherein the amplitude of the track error signal is detected by the amplitude detecting means for a period of one rotation or more in synchronization with the rotation of the optical disc medium.

9. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

a returned light quantity detecting means for detecting a returned light quantity from the optical disk medium;

an amplitude detecting means for detecting amplitude of an output signal of the returned light quantity detecting means; and a transfer means for transferring the optical pickup in a radial direction of the optical disk medium, wherein the focus control means focuses the light beam from the optical pickup onto the optical disk medium, and the adjusting means adjusts the gain and offset of the track error signal when the amplitude of the returned light quantity signal detected by the amplitude detecting means is equal to or larger than a previously set value, while the optical pickup is transferred to a previously decided position when the amplitude of the returned light quantity signal detected by the amplitude detecting means is under the previously set value.

10. The optical disk apparatus as defined in claim 9, wherein the amplitude of the returned light quantity signal is detected by the amplitude detecting means for a period of one rotation or more in synchronization with the rotation of the optical disk medium.

11. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

a returned light quantity detecting means for detecting a returned light quantity from the optical disk medium;

an amplitude detecting means for detecting amplitude of an output signal of the returned light quantity detecting means;

an objective lens shift means for providing a signal to the tracking driving means to shift an objective lens of the optical pickup in a radial direction of the optical disk medium; and a transfer means for transferring the optical pickup in the radial direction of the optical disk medium, wherein the focus control means focuses the light beam irradiated from the optical pickup onto the optical disk medium, and according to a first comparison result which is obtained by comparing amplitude of a first returned light quantity signal detected in the amplitude detecting means with a previously set value in a state where the objective lens of the optical pickup is shifted in an outer periphery direction of the optical disk medium by the objective lens shift means, as well as a second comparison result which is obtained by comparing amplitude of a second returned light quantity signal detected in the amplitude detecting means with the previously set value in a state where the objective lens of the optical pickup is shifted in an inner periphery direction of the optical disk medium by the objective lens shift means, the gain and offset of the track error signal are adjusted when the first and the second comparison results are both equal to or larger than the previously set value; the optical pickup is transferred in the outer periphery direction of the optical disk medium when the first comparison result is equal to or larger than the previously set value and the second comparison result is under the previously set value; the optical pickup is transferred in the inner periphery direction of the optical disk medium when the first comparison result is under the previously set value and the second comparison result is equal to or larger than the previously set value; and the optical pickup is transferred to a previously decided position when the first and the second comparison results are both under the previously set value.

12. The optical disk apparatus as defined in claim 11, wherein the amplitude of the returned light quantity signal is detected by the amplitude detecting means for a period of one rotation or more in synchronization with the rotation of the optical disk medium.

13. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

a returned light quantity detecting means for detecting a returned light quantity from the optical disk medium;

an amplitude detecting means for detecting amplitude of an output signal of the returned light quantity detecting means;

an objective lens shift means for providing a signal to the tracking driving means to shift an objective lens of the optical pickup in a radial direction of the optical disk medium; and a transfer means for transferring the optical pickup in the radial direction of the optical disk medium, wherein the transfer means transfers the optical pickup in an outer periphery direction of the optical disk medium, the focus control means focuses the light beam from the optical pickup onto the optical disk medium, and shift of the objective lens is stopped and the gain and offset of the track error signal are adjusted by the adjusting means when the amplitude of the returned light quantity signal detected by the amplitude detecting means is equal to or larger than a previously set value in a state where the objective lens of the optical pickup is shifted in the outer periphery direction of the optical disk medium by the objective lens shift means, while the optical pickup is transferred in an inner periphery direction of the optical disk medium when the amplitude of the returned light quantity signal detected by the amplitude detecting means is under the previously set value.

14. The optical disk apparatus as defined in claim 13, wherein the amplitude of the returned light quantity signal is detected by the amplitude detecting means for a period of one rotation or more in synchronization with the rotation of the optical disk medium.

15. An optical disk apparatus which comprises: an optical pickup which performs recording or reproduction of information into/from an optical disk medium having a track for information recording; a focus control means for controlling the optical pickup so as to focus a light beam on the optical disk medium; a tracking actuator which drives the optical pickup so that an irradiated position of the light beam follows the track for information recording; a track error detecting means for detecting a deviation from the track position of the irradiated position of the light beam; an adjusting means for adjusting gain and offset of a track error signal outputted by the track error detecting means; and a tracking driving means for driving the tracking actuator according to an output signal of the adjusting means, comprising:

a returned light quantity detecting means for detecting a returned light quantity from the optical disk medium;

an amplitude detecting means for detecting amplitude of an output signal of the returned light quantity detecting means;

an objective lens shift means for providing a signal to the tracking driving means to shift an objective lens of the optical pickup in a radial direction of the optical disk medium; and a transfer means for transferring the optical pickup in the radial direction of the optical disk medium, wherein the transfer means transfers the optical pickup in an inner periphery direction of the optical disk medium, the light beam irradiated from the optical pickup is focused onto the optical disk medium by the focus control means, and shift of the objective lens is stopped and the gain and offset of the track error signal are adjusted by the adjusting means when the amplitude of the returned light quantity signal detected by the amplitude detecting means is equal to or larger than a previously set value in a state where the objective lens of the optical pickup is shifted in the inner periphery direction of the optical disk medium by the objective lens shift means, while the optical pickup is transferred in an outer periphery direction of the optical disk medium when the amplitude of the returned light quantity signal detected by the amplitude detecting means is under the previously set value.

16. The optical disk apparatus as defined in claim 15, wherein the amplitude of the returned light quantity signal is detected by the amplitude detecting means for a period of one rotation or more in synchronization with the rotation of the optical disk medium.

* * * * *